United States Patent
Nishino et al.

(10) Patent No.: US 7,644,998 B2
(45) Date of Patent: Jan. 12, 2010

(54) BRAKE CONTROL SYSTEM

(75) Inventors: Kimio Nishino, Hitachinaka (JP);
Toshiharu Sugawara, Hitachi (JP);
Kenichiro Matsubara, Kasumigaura (JP); Toshiyuki Innami, Mito (JP);
Hitoshi Kobayashi, Machida (JP)

(73) Assignee: Hitachi, Ltd., Tokyo (JP)

( * ) Notice: Subject to any disclaimer, the term of this patent is extended or adjusted under 35 U.S.C. 154(b) by 29 days.

(21) Appl. No.: 11/837,177

(22) Filed: Aug. 10, 2007

(65) Prior Publication Data

US 2008/0054718 A1 Mar. 6, 2008

(30) Foreign Application Priority Data

Aug. 31, 2006 (JP) ............................. 2006-234865

(51) Int. Cl.
*B60T 8/60* (2006.01)

(52) U.S. Cl. ...................................... 303/140; 303/146

(58) Field of Classification Search ...................... 303/3, 303/15, 140, 146

See application file for complete search history.

(56) References Cited

U.S. PATENT DOCUMENTS

| 6,158,822 A * | 12/2000 | Shirai et al. ..................... 303/3 |
| 6,416,140 B1 | 7/2002 | Yamamoto et al. |
| 2008/0106142 A1* | 5/2008 | Nishino et al. ................ 303/10 |

FOREIGN PATENT DOCUMENTS

| JP | 2001-158336 A | 6/2001 |
| JP | 2004-210054 A | 7/2004 |

* cited by examiner

*Primary Examiner*—Christopher P Schwartz
(74) *Attorney, Agent, or Firm*—Crowell & Moring LLP

(57) ABSTRACT

Even in the case that at least one braking force generating function fails, it is possible to secure a maximum braking force as well as suppressing a yaw moment generated on the basis of the failure as much as possible even at a time when whatever braking force is requested, A target braking force to a normal brake apparatus is calculated on the basis of a result of detection by a malfunction detecting portion, in such a manner that a total of braking forces generated in the brake apparatuses in respective wheels becomes as equal as possible to a requested braking force, at a time when a malfunction is generated in the brake apparatus or a braking force control portion.

2 Claims, 21 Drawing Sheets

BRAKE CONTROL SYSTEM

BACKGROUND OF THE INVENTION

1. Field of the Invention

The present invention relates to a brake apparatus of a vehicle, and more particularly to a brake control apparatus controlling a braking force individually with respect to each of wheels.

2. Description of Related Art

There has been known a brake apparatus of a motor vehicle in which a brake apparatus is provided in each of wheels of the motor vehicle, thereby capable of independently controlling the braking force of each of the wheels. In the brake apparatus mentioned above, there is requested a method of suppressing a reduction of a yaw moment and a maximum braking force which are generated together with a failure of the brake apparatus in at least one wheel.

For example, there has been known a structure in the case of a failure of a motor-driven brake apparatus in at least one wheel, a brake control apparatus detects a stability or an instability of a vehicle travel in accordance with a traveling state of the vehicle on the basis of an information from a sensor or the like installed in the vehicle, allows an enlargement of a difference between the braking forces in a right side and a left side with respect to a moving direction of the vehicle and actuating two or more normal brake apparatuses in the case of the stability (for example, refer to patent document 1(JP-A-2001-158336)).

However, in the case that the brake control apparatus detects the stability of the vehicle travel, the brake control apparatus controls the brake apparatus in such a manner that the difference is generated between the braking forces in the right side and the left side with respect to the moving direction of the vehicle, even in the case that the requested braking force on the basis of a force on a brake pedal applied by a driver is not so large as to generate a yaw moment in the vehicle.

BRIEF SUMMARY OF THE INVENTION

An object of the present invention is to suppress a yaw moment generated together with a failure of a braking force generating function in at least one wheel as much as possible, and to secure a braking force to the maximum in the case that a requested braking force is large.

A target braking force applied to a normal brake apparatus is calculated on the basis of a result of detection in a malfunction detecting portion in such a manner that a total of the braking forces generated by the brake apparatuses in the respective wheels becomes as equal as possible to the requested braking force, at a time when the malfunction is generated in the brake apparatus or the braking force control portion.

Specifically, in accordance with the present invention, there is provided a brake control system comprising:

a braking force allocation control portion calculating a target braking force generated in a brake apparatus in each of wheels on the basis of a requested braking force;

a braking force control portion installed in each of the wheels of a vehicle, and controlling a brake apparatus installed in each of the wheels on the basis of a result of calculation of the braking force allocation control portion; and a malfunction detecting portion detecting a malfunction of the brake apparatus on the basis of a result of detection of a malfunction detecting means of the brake apparatus, wherein the braking force allocation control portion calculates a target braking force applied to the normal brake apparatus on the basis of the result of detection of the malfunction detecting portion in such a manner that a total of the braking forces generated by the brake apparatuses in the respective wheels becomes the requested braking force, at a time when a malfunction is generated in the brake apparatus or the braking force control portion.

Further, in accordance with the present invention, there is provided a brake control system comprising:

a braking force allocation control portion calculating a target braking force generated in a brake apparatus in each of wheels on the basis of a requested braking force;

a braking force control portion installed in each of the wheels of a vehicle, and controlling a brake apparatus installed in each of the wheels on the basis of a result of calculation of the braking force allocation control portion; and a malfunction detecting portion detecting a malfunction of the brake apparatus on the basis of a result of detection of a malfunction detecting means of the brake apparatus, wherein the braking force allocation control portion calculates a target braking force applied to the normal brake apparatus on the basis of the result of detection of the malfunction detecting portion in such a manner that a sum of the braking forces generated in a plurality of wheels provided in a right side of a vehicle becomes equal to a sum of the braking forces generated in a plurality of wheels provided in a left side of the vehicle.

Further, in the brake control system, it is preferable that the braking force allocation control portion controls in such a manner that a first braking force of the brake apparatus in the same vehicle lateral direction and an opposite vehicle longitudinal direction to the brake apparatus under malfunction in the brake apparatuses becomes equal to a second braking force of the brake apparatus in an opposite vehicle lateral direction and an opposite vehicle longitudinal direction to the brake under malfunction.

Further, in the brake control system, it is preferable that the braking force allocation control portion inhibits a braking control of the braking force control portion of the brake apparatus in the opposite vehicle lateral direction and the same vehicle longitudinal direction to the brake apparatus under malfunction.

Further, in the brake control system, it is preferable that the braking force allocation control portion cancel the inhibition of the braking control of the braking force control portion of the brake apparatus in the opposite vehicle lateral direction and the same vehicle longitudinal direction, in the case that any one of the first braking force and the second braking force becomes larger than a previously determined braking force limit value, thereby controlling so as to achieve the target braking force.

Further, in the brake control system, it is preferable that the braking force allocation control portion controls in such a manner that a first braking force of the brake apparatus in the same vehicle lateral direction and an opposite vehicle longitudinal direction to the brake apparatus under malfunction in the brake apparatuses becomes equal to a third braking force of the brake apparatus in an opposite vehicle lateral direction and the same vehicle longitudinal direction to the brake under malfunction.

Further, in the brake control system, it is preferable that the braking force allocation control portion inhibits a braking control of the braking force control portion of the brake apparatus in the opposite vehicle lateral direction and the opposite vehicle longitudinal direction to the brake apparatus under malfunction.

Further, in the brake control system, it is preferable that the braking force allocation control portion cancel the inhibition of the braking control of the braking force control portion of the brake apparatus in the opposite vehicle lateral direction and the opposite vehicle longitudinal direction, in the case that any one of the first braking force and the third braking force becomes larger than a previously determined braking force limit value, thereby controlling so as to achieve the target braking force.

Further, in accordance with the present invention, there is provided a brake control system comprising:

a braking force allocation control portion calculating a target braking force generated in a brake apparatus in each of wheels on the basis of a requested braking force;

a braking force control portion installed in each of the wheels of a vehicle, and controlling a brake apparatus installed in each of the wheels on the basis of a result of calculation of the braking force allocation control portion; and a malfunction detecting portion detecting a malfunction of the brake apparatus on the basis of a result of detection of a malfunction detecting means of the brake apparatus, wherein the braking force allocation control portion controls a braking force of at least any one the brake apparatus in an opposite vehicle lateral direction and the same vehicle longitudinal direction to the brake apparatus under malfunction, and the brake apparatus in the opposite vehicle lateral direction and an opposite vehicle longitudinal direction to the brake apparatus under malfunction so as to come to the target braking force, in the case that a first braking force of the brake apparatus in the same vehicle lateral direction and the opposite vehicle longitudinal direction to the brake apparatus under malfunction reaches a previously determined braking force limit value.

Further, in accordance with the present invention, there is provided a brake control system comprising:

a braking force allocation control portion calculating a target braking force generated in a brake apparatus in each of wheels on the basis of a requested braking force;

a braking force control portion installed in each of the wheels of a vehicle, and controlling a brake apparatus installed in each of the wheels on the basis of a result of calculation of the braking force allocation control portion;

a malfunction detecting portion detecting a malfunction of the brake apparatus on the basis of a result of detection of a malfunction detecting means of the brake apparatus; and an allowable yaw moment calculating portion calculating an allowable yaw moment allowing a vehicle to safely travel, on the basis of a result of detection of the malfunction detecting portion and at least one of a vehicle speed and a steered angle, wherein the braking force allocation control portion increases a braking force of the brake apparatus in the same vehicle longitudinal direction and an opposite vehicle lateral direction to the brake apparatus under malfunction, in such a manner that the braking force of the vehicle becomes equal to or less than the allowable yaw moment in the case that the braking force of the vehicle does not reach the target braking force.

Further, in the brake control system, it is preferable that the braking force allocation control portion calculates a target braking force applied to the normal brake apparatus on the basis of the result of detection of the malfunction detecting portion in such a manner that a sum of the braking forces generated in a plurality of wheels provided in a right side of a vehicle becomes equal to a sum of the braking forces generated in a plurality of wheels provided in a left side of the vehicle.

Further, in the brake control system, it is preferable that the braking force allocation control portion controls in such a manner that a first braking force of the brake apparatus in the same vehicle lateral direction and an opposite vehicle longitudinal direction to the brake apparatus under malfunction in the brake apparatuses becomes equal to a second braking force of the brake apparatus in an opposite vehicle lateral direction and an opposite vehicle longitudinal direction to the brake under malfunction.

Further, in the brake control system, it is preferable that the braking force allocation control portion inhibits a braking control of the braking force control portion of the brake apparatus in the opposite vehicle lateral direction and the same vehicle longitudinal direction to the brake apparatus under malfunction.

Further, in the brake control system, it is preferable that the braking force allocation control portion cancel the inhibition of the braking control of the braking force control portion of the brake apparatus in the opposite vehicle lateral direction and the same vehicle longitudinal direction, in the case that any one of the first braking force and the second braking force becomes larger than a previously determined braking force limit value, thereby controlling so as to achieve the target braking force.

Further, in accordance with the present invention, there is provided a brake control system comprising:

a braking force allocation control portion calculating a target braking force generated in a brake apparatus in each of wheels on the basis of a requested braking force, and allocating a braking force to the brake apparatus on the basis of the result of calculation and a braking force allocation ratio previously determined with respect to each of the wheels;

a braking force control portion installed in each of the wheels of a vehicle, and controlling a brake apparatus installed in each of the wheels on the basis of a result of calculation of the braking force allocation control portion; and an allowable yaw moment calculating portion calculating an allowable yaw moment allowing a vehicle to safely travel, on the basis of a result of braking force allocation of the braking force allocation control portion, wherein the braking force allocation control portion changes the braking force allocation of the braking force allocation control portion on the basis of a comparison between the result of calculation of the allowable yaw moment calculating portion and a vehicle behavior information from an external portion, and controls the brake apparatus on the basis of the changed braking force allocation.

Further, in the brake control system, it is preferable that the vehicle behavior information from the external portion is constituted by a yaw moment of the vehicle, and the braking force allocation control portion changes the braking force allocation in such a manner that the yaw moment of the vehicle becomes smaller than the result of calculation of the allowable yaw moment calculating portion in the case that the yaw moment of the vehicle is larger than the result of calculation of the allowable yaw moment calculating portion, and controls the brake apparatus on the basis of the changed braking force allocation.

Further, in the brake control system, it is preferable that the brake control system has a malfunction detecting portion detecting a malfunction of the brake apparatus on the basis of the result of detection of a malfunction detecting means of the brake apparatus, and the allowable yaw moment calculating portion calculates an allowable yaw moment allowing the vehicle to safely travel, on the basis of a result of detection of the malfunction detecting portion and at least one of a vehicle speed and a steered angle.

In accordance with the present invention, even in the case that the braking force generating function is failed in at least one wheel, it is possible to suppress the yaw moment generated by the failure as much as possible even at a time of whatever requested braking force, and it is possible to secure the maximum braking force.

Other objects, features and advantages of the invention will become apparent from the following description of the embodiments of the invention taken in conjunction with the accompanying drawings.

DETAILED DESCRIPTION OF THE INVENTION

A description will be in detail given below of embodiments in accordance with the present invention with reference to the accompanying drawings.

Figure 1:
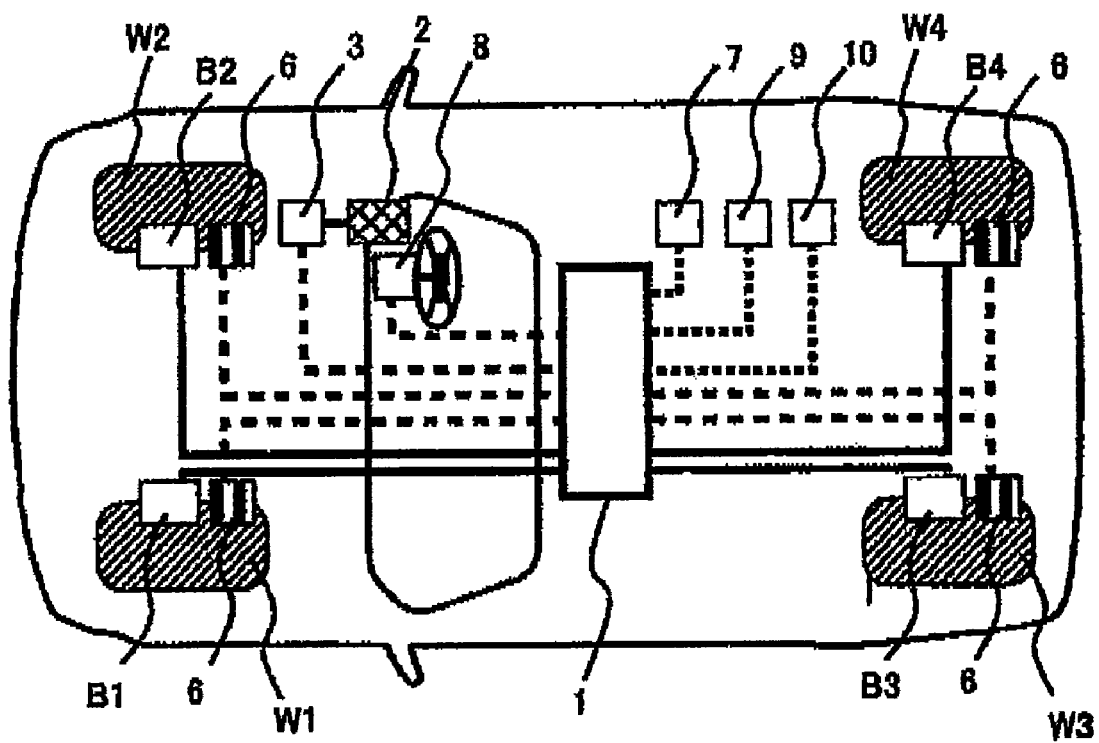
FIG. 1 is a schematic view of a motor vehicle mounting a brake control apparatus controlling a plurality of motor-driven brake apparatuses thereon, in accordance with an embodiment of the present invention.

FIG. 1 is a schematic view of a motor vehicle mounting a brake control apparatus controlling a plurality of motor-driven brake apparatuses thereon. Motor-driven brake units B1, B2, B3 and B4 are respectively attached to wheels W1 (front left), W2 (front right), W3 (rear left) and W4 (rear right) of a motor vehicle, and a braking force is generated in each of the wheels W1 to W4 in accordance with a control signal from a brake control apparatus 1.

A brake operating amount detecting apparatus detecting an operating amount of a brake pedal by a driver is connected to the brake control apparatus 1, and the brake control apparatus calculates a necessary braking force on the basis of an input pedaling amount of the driver, and outputs a control signal to motor-driven brake units B1 to B4 in respective wheels so as to achieve the braking force. The motor-driven brake units B1 to B4 generate the braking force in the respective wheels on the basis of the control signal receiving from the brake control apparatus. In this case, the brake pedal 2 indicates a means which the driver inputs a braking operation of the motor vehicle such as a joy stick or the like, and can employ both of a force sensor and a stroke sensor, or any one of them, as the brake operating amount detecting apparatus.

Further, the structure is made such that signals are input to the brake control apparatus 1 from a vehicle speed sensor 6 detecting speeds of the respective wheels of the motor vehicle (wheel speeds of the totally four wheels in the front, rear, right and left wheels), a yaw rate sensor 7 detecting a yaw rate of the motor vehicle, a steered angle sensor 8 detecting a steered angle, a longitudinal acceleration sensor 9 detecting an acceleration in a longitudinal direction of the motor vehicle, a lateral acceleration sensor 10 detecting an acceleration in a lateral direction of the motor vehicle, and the like.

Figure 2:
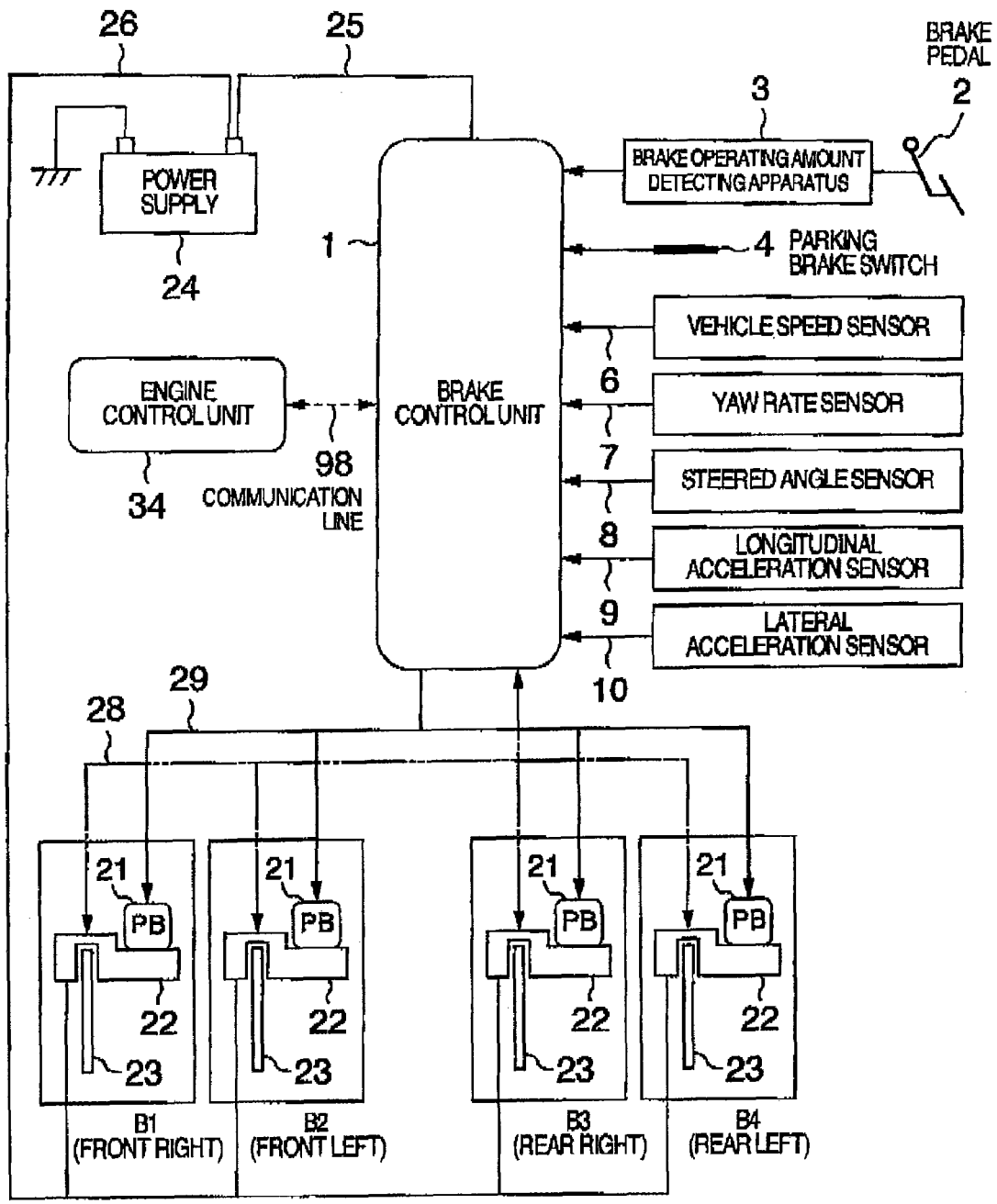
FIG. 2 is a view showing a system structure of FIG. 1.

FIG. 2 shows a system structure including the brake control apparatus 1, the motor-driven brake units of the respective wheels, and signal lines and power lines connecting them.

As shown in FIG. 1, the structure is made such that various sensor information is input to the brake control apparatus 1 from the brake operating amount detecting apparatus 3 detecting the operating amount of the brake pedal 2 by the driver, the vehicle speed sensor 6 detecting the speeds of the respective wheels of the motor vehicle (the wheel speeds of the totally four wheels in the front, rear, right and left wheels), the yaw rate sensor 7 detecting the yaw rate of the motor vehicle, the steered angle sensor 8 detecting the steered angle, the longitudinal acceleration sensor 9 detecting the acceleration in the longitudinal direction of the motor vehicle, the lateral acceleration sensor 10 detecting the acceleration in the lateral direction of the motor vehicle, and the like. In this case, the brake pedal 2 indicates the brake operation input means of the motor vehicle by the driver such as the joy stick or the like. Further, as the brake operating amount detecting apparatus, it is possible to employ the force sensor and the stroke sensor, or any one of them. Further, the brake control apparatus 1 is connected to a communication line 98, and can send and receive the information with respect to the other control units as occasion demands. In the present embodiment, the communication with an engine control unit is executed. The communication line 98 can be achieved by CAN or the like.

Each of the motor-driven brake units B1 to B4 of the respective wheels is provided with a braked member 23 which is attached to each of the wheels W1 to W4 of the motor vehicle and rotates integrally with each of the wheels, a braking member (not shown), and a motor-driven brake actuator 22 pressing the braking member to the braked member 23 by a force of a motor. As an example of the braked member 23, there are a brake disc and a brake drum, and as an example of the braking member, there is a brake pad. As an example of a structure of the motor-driven brake actuator 22, there has been known, for example, a structure as described in Japanese Unexamined Patent Publication No. 2002-213507. The present invention is not limited to a specific mechanism structure of the motor-driven brake actuator, but can employ various structured motor-driven brake actuators. The motor-driven brake units B1 to B4 generate the braking force in the respective wheels W1 to W4 on the basis of a force (a thrust force) by which the motor-driven brake actuator 22 presses the braked member 23.

In FIG. 2, there is connected a communication line 28 transmitting a control signal from the brake control apparatus 1 of each of the motor-driven brake units B1 to B4 to each of the motor-driven brake units B1 to B4 and transmitting the information such as the thrust force, the current value or the like of each of the motor-driven brake actuators 22 from each of the motor-driven brake units B1 to B4 to the brake control apparatus 1. In this case, the communication means mentioned above can be achieved by the CAN or the like. Further, a power line 26 supplying an electric power to the motor-driven brake actuator 22 is connected.

Further, the motor-driven brake system in accordance with the present embodiment is provided with a parking brake function. The structure is made such that a signal from a parking brake switch 4 is input to the brake control apparatus 1, and a parking mechanism portion 21 is provided in the motor-driven brake units B1 to B4 in the respective wheels. The parking brake mechanism portion 21 is a mechanism for regulating a movement of the brake pad or an operation of the motor-driven brake actuator 22 in accordance with a command from an external portion, and keeps a brake thrust force (a force pressing the braking member to the braked member 23) at the time when a current application to the motor-driven brake actuator is stopped.

A signal line 29 inputting a command signal from the brake control apparatus 1 is connected to the parking brake mechanism portion 21, and if the parking brake switch 4 is operated, the brake control apparatus 1 actuates the motor-driven brake actuator 22 so as to generate the brake thrust force. The command is transmitted to the parking brake mechanism portion 21 in a state in which the brake thrust force is generated, and the brake thrust force is maintained.

Further, the brake control unit 1 is connected to the communication line 98, and can send and receive the information with respect to the other control unit as occasion demands. In the present embodiment, the communication is executed with respect to the engine control unit. The communication line 98 can be achieved by the CAN or the like.

Further, the structure is made such that the various sensor information is input to the brake control unit 1 from the brake operating amount detecting apparatus 3 detecting the operating amount of the brake pedal 2, the vehicle speed sensor 6 indicating the speeds of the respective wheels of the motor vehicle (the wheel speeds of totally four wheels in the front, rear, right and left wheels), the yaw rate sensor 7 indicating the yaw rate of the motor vehicle, the steered angle sensor 8 indicating the steered angle, the longitudinal acceleration sensor 9 indicating the acceleration in the longitudinal direction of the motor vehicle, the lateral acceleration sensor 10 indicating the acceleration in the lateral direction of the motor vehicle and the like.

In this case, the brake pedal 2 indicates the brake operation input means of the motor vehicle by the driver, such as the joy stick or the like. Further, as the brake operating amount detecting apparatus, it is possible to employ the force sensor and the stroke sensor or any one of them.

The brake control unit 1 is constituted by a CPU, a ROM, a RAM, an input portion, an output portion and a communication portion. The brake control unit incorporates various sensor information of the brake operating amount detecting apparatus 3 detecting the operating amount of the brake pedal 2 by the driver and the like from the input portion, calculates a target braking force of each of the wheels by the CPU together with the information of the ROM and the information of the communication, and outputs the control signal from the output portion. Each of the motor-driven brake units controls the motor in accordance with the control signal and generates the braking force in each of the wheels W1 to W4.

Figure 3:
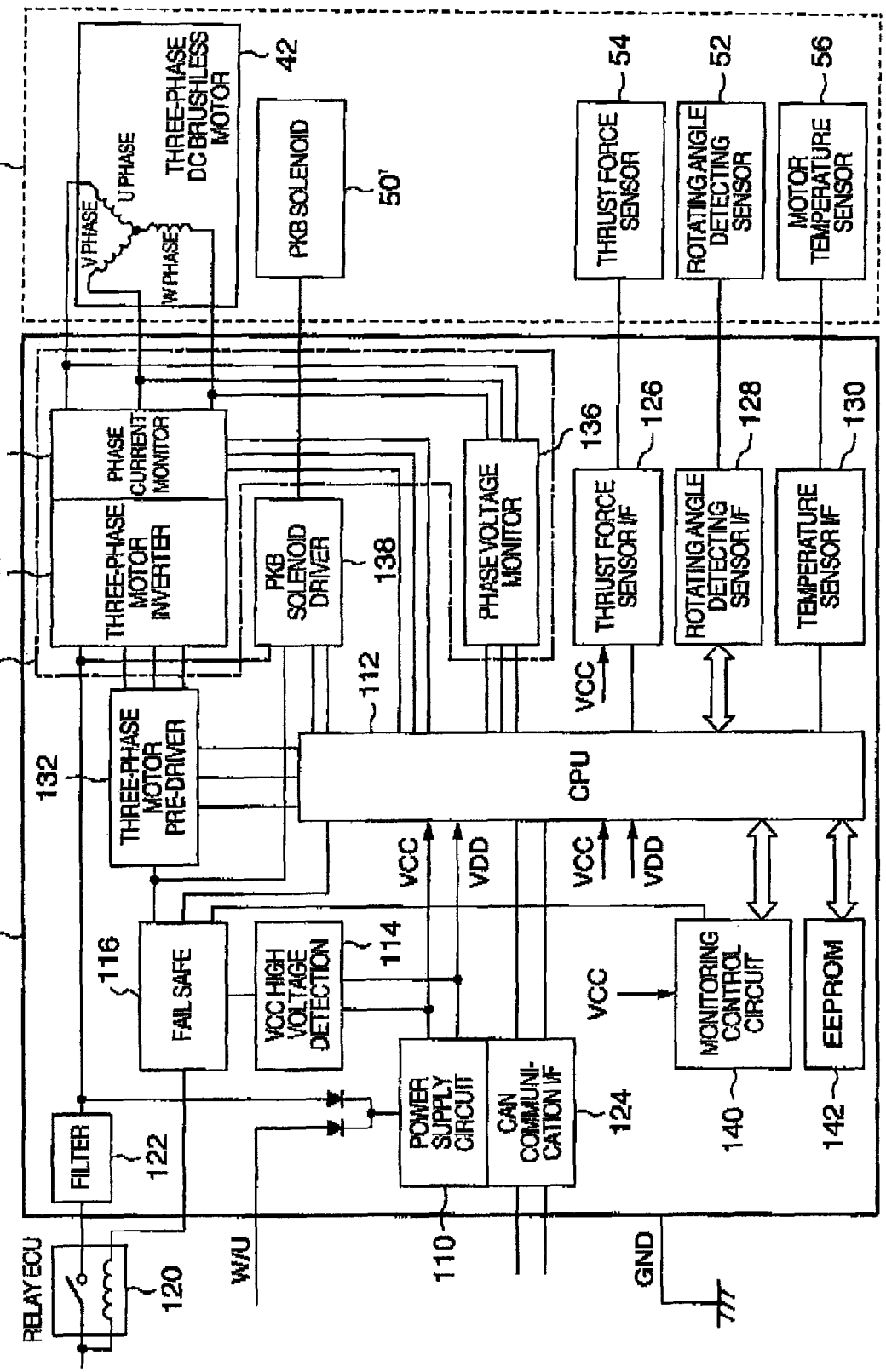
FIG. 3 is a view showing a circuit structure of a motor-driven brake unit in FIG. 1.

FIG. 3 shows a circuit structure of the motor-driven brake unit in FIG. 1.

First, the structure is made such that a power supply fed via a power supply line PWL within the vehicle is input to a power supply circuit 110, in a circuit of a drive circuit portion DCP surrounded by a thick line frame A. Further, the structure is made such that the power supply (Vcc, Vdd) obtained by the power supply circuit 110 is fed to a central control circuit (CPU) 112.

Further, the power supply (Vcc, Vdd) from the power supply circuit 110 is detected by a VCC high voltage detecting circuit 114, and in the case that the high voltage is detected by the VCC high voltage detecting circuit 114, a fail safe circuit 116 is operated.

The structure is made such that the fail safe circuit 116 actuates a relay control circuit 120 switching the power supply fed to a three-phase motor inverter circuit 118 mentioned below, and in the case that the high voltage is detected by the VCC high voltage detecting circuit 114, the feed of the power supply is set to an off state.

A noise of the power supply fed via the relay control circuit 120 is removed via a filter circuit 122, and the power supply is fed to the three-phase motor inverter circuit 118.

The structure is made such that the control signal from the brake control apparatus 1 (refer to FIG. 2) is input to the central control circuit 112 via a CAN communication interface circuit 124, and the structure is made such that outputs from a thrust sensor 54, a rotating angle detecting sensor 52 and a motor temperature sensor 56 arranged in a caliper side of the motor-driven brake are respectively input via a thrust force sensor interface circuit 126, a rotating angle detecting sensor interface circuit 128 and a motor temperature sensor interface circuit 130. Because a suitable thrust force for the electric motor 42 can be obtained by inputting the information relating to the condition or the like of the electric motor 42 at the current time pint and executing a feedback control on the basis of the control signal from the brake control apparatus 1.

In other words, the central control circuit 112 is structured such as to output a suitable signal to a three-phase motor pre driver circuit 132 on the basis of the control signal from the brake control apparatus 1 and the detected value of each of the sensors, and the three-phase motor pre driver circuit 132 is structured such as to control the three-phase motor inverter circuit 118. In this case, the three-phase motor inverter circuit 118 is provided with a phase current monitor circuit 134 and a phase voltage monitor circuit 136, and the structure is made such as to monitor a phase current and a phase voltage respectively by the phase current monitor circuit 134 and the phase voltage monitor circuit 136, and the outputs suitably actuate the three-phase motor pre driver circuit 132 via the central control circuit 112. The three-phase motor inverter circuit 118 is structured such as to be connected to the electric motor 42 within the caliper of the motor-driven brake so as to executed the driving in correspondence to the control executed by the central control circuit 112.

Further, the central control circuit 112 is structured such as to actuate a PKB solenoid 50' within a driving mechanism portion DMP so as to execute a parking brake via a parking brake (PKB) solenoid driver circuit 139 on the basis of the control signal from the brake control apparatus 1, the detected value of each of the sensors and the like. In this case, the structure is made such that the power supply fed to the three-phase motor inverter circuit 118 is fed to the PKB solenoid driver circuit 138.

Further, the drive circuit portion DCP is provided with a monitoring control circuit 140 sending and receiving the signal with respect to the central control circuit 112, for example, a memory circuit 142 constituted by EEPROM in which a malfunction information or the like is stored, and the central control circuit 112 executes a control for obtaining the suitable thrust force in the driving of the electric motor 42 on the basis of the information from the monitoring control circuit 140 and the memory circuit 142.

Figure 4:
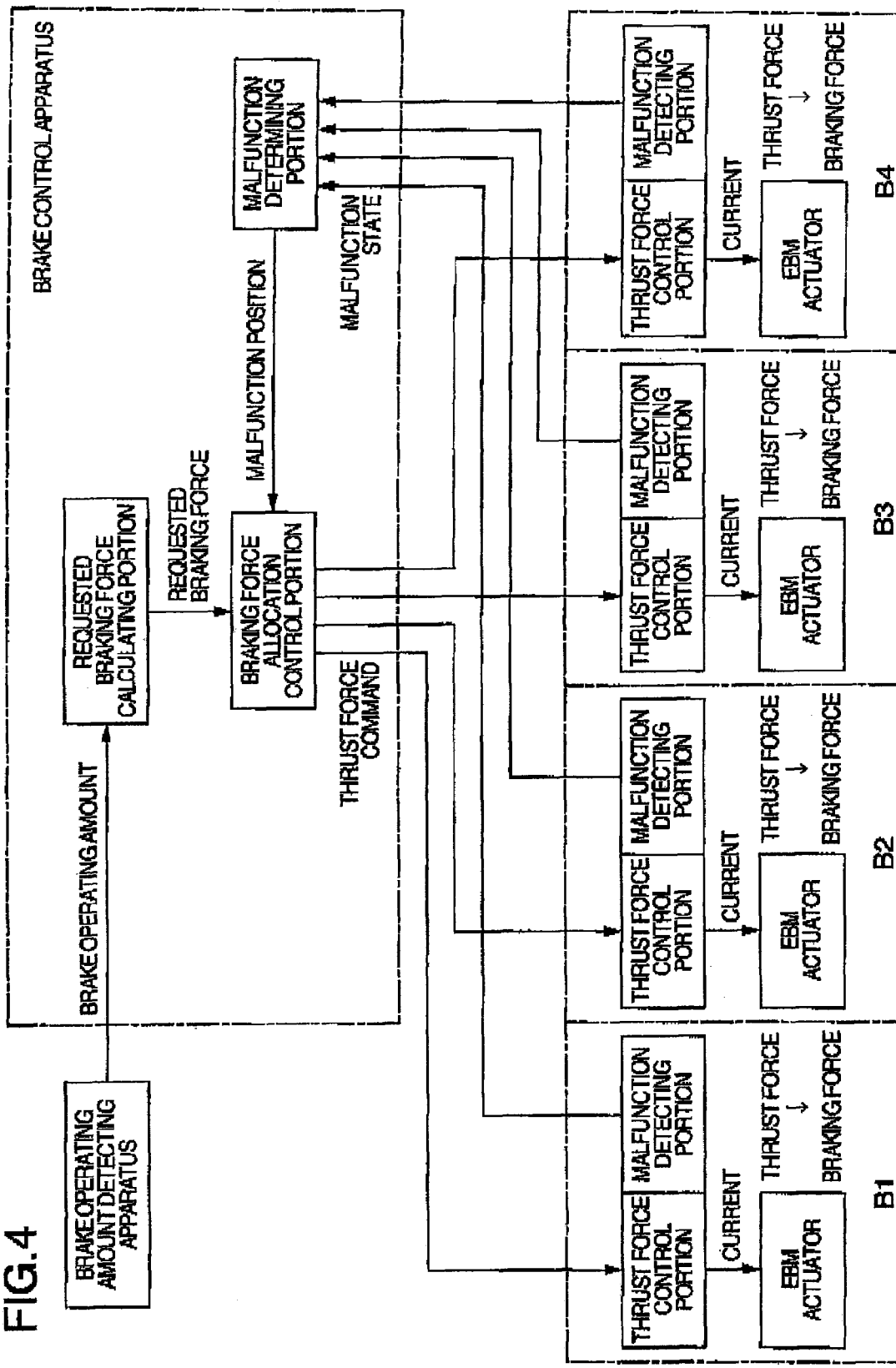
FIG. 4 is a view showing a control block structure of a brake control apparatus in FIG. 1.

FIG. 4 shows a control block structure of the brake control apparatus in FIG. 1.

In a requested braking force calculating portion, a requested braking force Fcmd is calculated on the basis of a brake operating amount detected by the brake operating amount detecting apparatus 3.

A malfunction determining portion determines which wheel is out of order on the basis of a malfunction state from the malfunction detecting portion of each of the motor-driven brake units.

A braking force allocation control portion allocates the requested braking force Fcmd into the target braking force generated in each of the wheels on the basis of the malfunction position from the malfunction determining portion, and converts into the thrust force command value generated by the motor-driven brake unit.

The thrust force control portion of the motor-driven brake units B1 to B4 controls the motor-driven brake actuator in each of the wheels on the basis of the thrust force command value, and generates the braking force.

Further, the malfunction detecting portion in the motor-driven brake units B1 to B4 refers to the thrust force command value, and an actual thrust force from the thrust force sensor within the motor-driven brake actuator, and determines the malfunction of the motor-driven brake units B1 to B4 in accordance with this comparison. Specifically, in the case that a difference between the thrust force command value and the actual thrust force is equal to or more than a predetermined value, in the case that the difference equal to or more than the predetermined value between the thrust force command value and the actual thrust force lasts for a predetermined time or more, or the like, it determines that the motor-driven brake unit breaks down. In accordance with this structure, it is possible to independently detect at least the malfunction of the motor-driven brake actuators B1 to B4.

Further, the malfunction detecting portion can be structured such that the voltage directly detecting the various malfunctions and the information from the current detecting portion are input thereto. For example, the malfunction detecting portion may refer to the value from the voltage detecting portion for detecting the malfunction of the motor-driven brake actuator 22 caused by a disconnection or a contact failure of the signal line 27 or 28, a disconnection or a contact failure of the power supply line 26a or 26b, a voltage reduction or a malfunction of the power supply 24 or the like, thereby detecting the malfunction.

Figure 5:
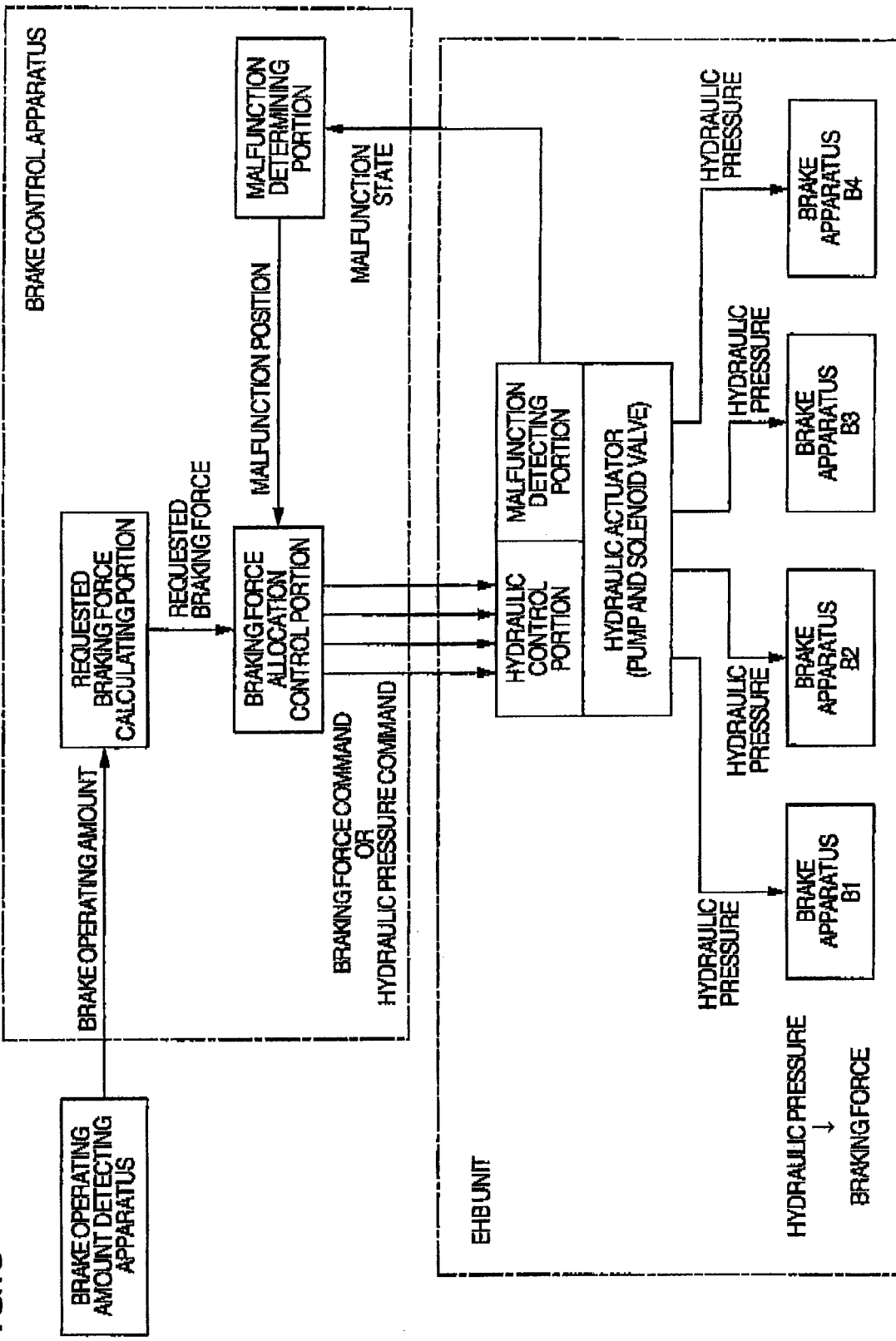
FIG. 5 is a view showing a control block structure of a brake control apparatus in accordance with the other embodiment of the present invention.

FIG. 5 shows a control block structure of a brake control apparatus in accordance with the other embodiment of the present invention. This is structured such that the control structure employs a hydraulic motor-driven brake unit in place of the motor-driven brake unit, as a slave system of the brake control apparatus.

The structure is the same as the case of using the motor-driven brake unit, until the requested braking force Fcmd is allocated to the target braking force generated in each of the wheels on the basis of the malfunction position applied from the malfunction determining portion by the braking force allocation control portion, and is different only in a point that the target braking force in each of the wheels is generated by the hydraulic motor-driven brake unit. The present invention relates to a method of calculating the target braking force in each of the wheels, and a description will be given of an embodiment in accordance with the present invention on the basis of a case of using the motor-driven brake unit. However, the same matter is applied even in the case that the slave system is constituted by the hydraulic motor-driven brake.

Further, in the motor-driven brake unit or the hydraulic motor-driven brake unit, since approximately a faithful braking force can be generated with respect to the target braking force in each of the wheels, a description will be given on the assumption that the target braking force equals to the braking force.

Figure 6:
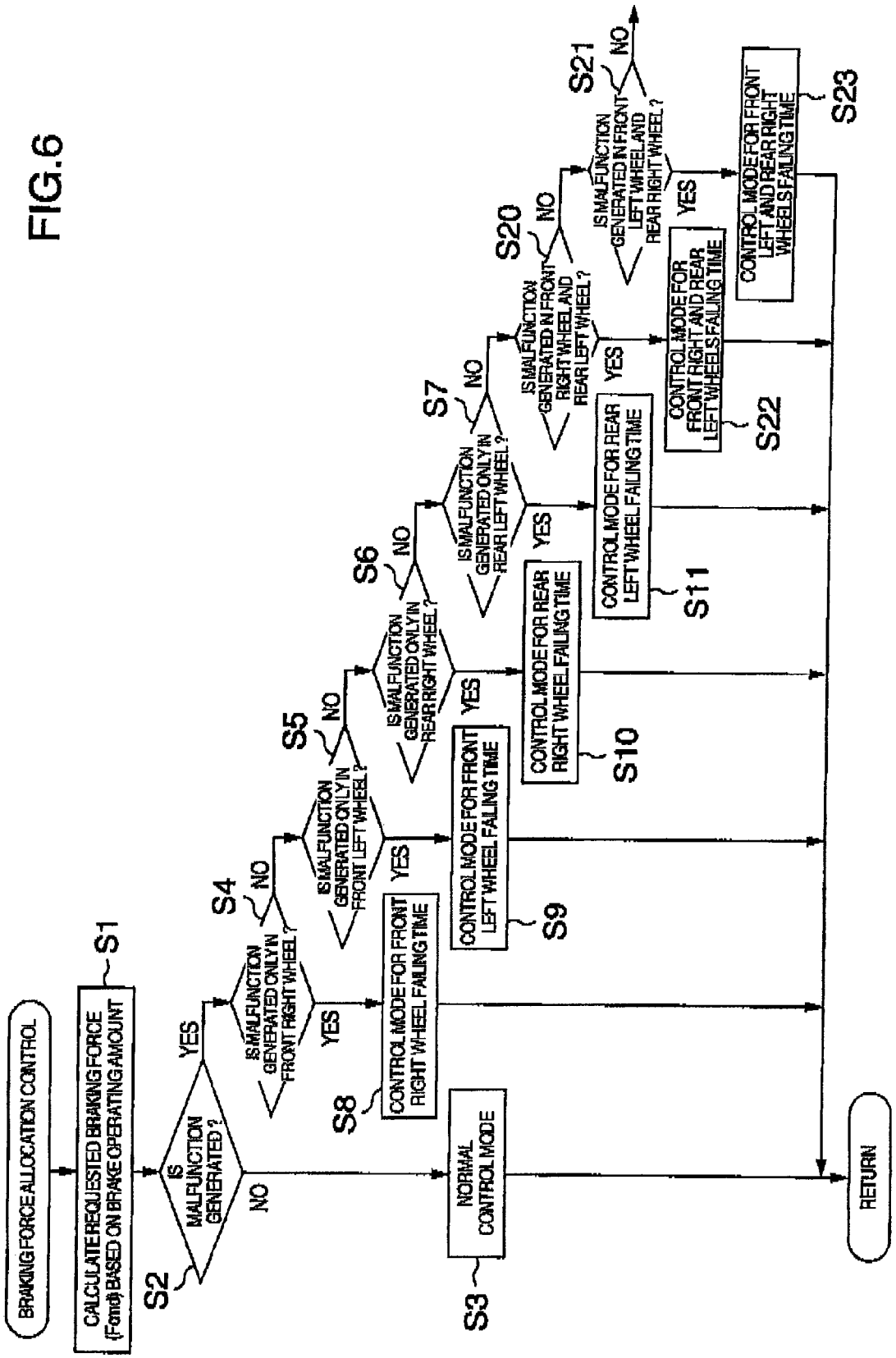
FIG. 6 is a control flow chart of a brake control apparatus in accordance with an embodiment of the present invention.

FIG. 6 shows a control flow chart of a brake control apparatus in accordance with an embodiment of the present invention.

The flow chart in FIG. 6 is widely separated into two structures having a braking force allocation at a normal time in a step 3 (hereinafter, refer briefly to S3) and a braking force allocation at a malfunction time from S4 to S23. In the present invention, a mode for calculating the braking force generated in each of the wheels is set, and the control is executed by switching the mode on the basis of the malfunction wheel such as the control is executed by S3 at the normal time, and the control is executed by S3 to S11 at the malfunction time.

First, the step S1 calculates the requested braking force Fcmd of the driver on the basis of the brake operating amount detecting apparatus 3.

The step S2 determines by the malfunction detecting portion mentioned below whether or not an abnormality is generated in the brake apparatus.

In this case, in the case that it is determined that the abnormality is not generated in the brake, the requested braking force Fcmd is allocated to the front, rear, right and left wheels as usual in accordance with the normal control mode in the step S3.

In the case that the step S2 determines that the abnormality is generated in the brake, the steps S4 to S7, S20 and S21 determine which wheel brake apparatus is out of order, and the target braking force generated in each of the wheels by the control mode in the steps S8 to S11, S22 and S23 is calculated in correspondence to the wheel in which the brake apparatus breaks down. In this case, as the control mode of the target braking force allocation in correspondence to each of the failure wheels, the braking force originally generated in the failure wheel due to the malfunction is allocated to the other normal wheels than the failure wheel, and the target braking force is allocated additionally at the more allocated amount than the normal time.

In accordance with the steps S1 to S23, the thrust force command value is calculated in each of the wheels on the basis of the calculated target braking force generated in each of the wheels, and the braking force is generated by the motor-driven-brake unit.

The total of the braking forces generated in the respective wheels becomes equal to the requested braking force until the total reaches the maximum braking force, by compensating the braking force generated in the wheel under malfunction with the other wheels as mentioned above.

In accordance with the present embodiment, even in the case that the malfunction is generated, it is possible to generate the braking force in accordance with the requested braking force within the range of the maximum braking force, and it is possible to make a stopping distance equal to the normal time.

Figure 7:
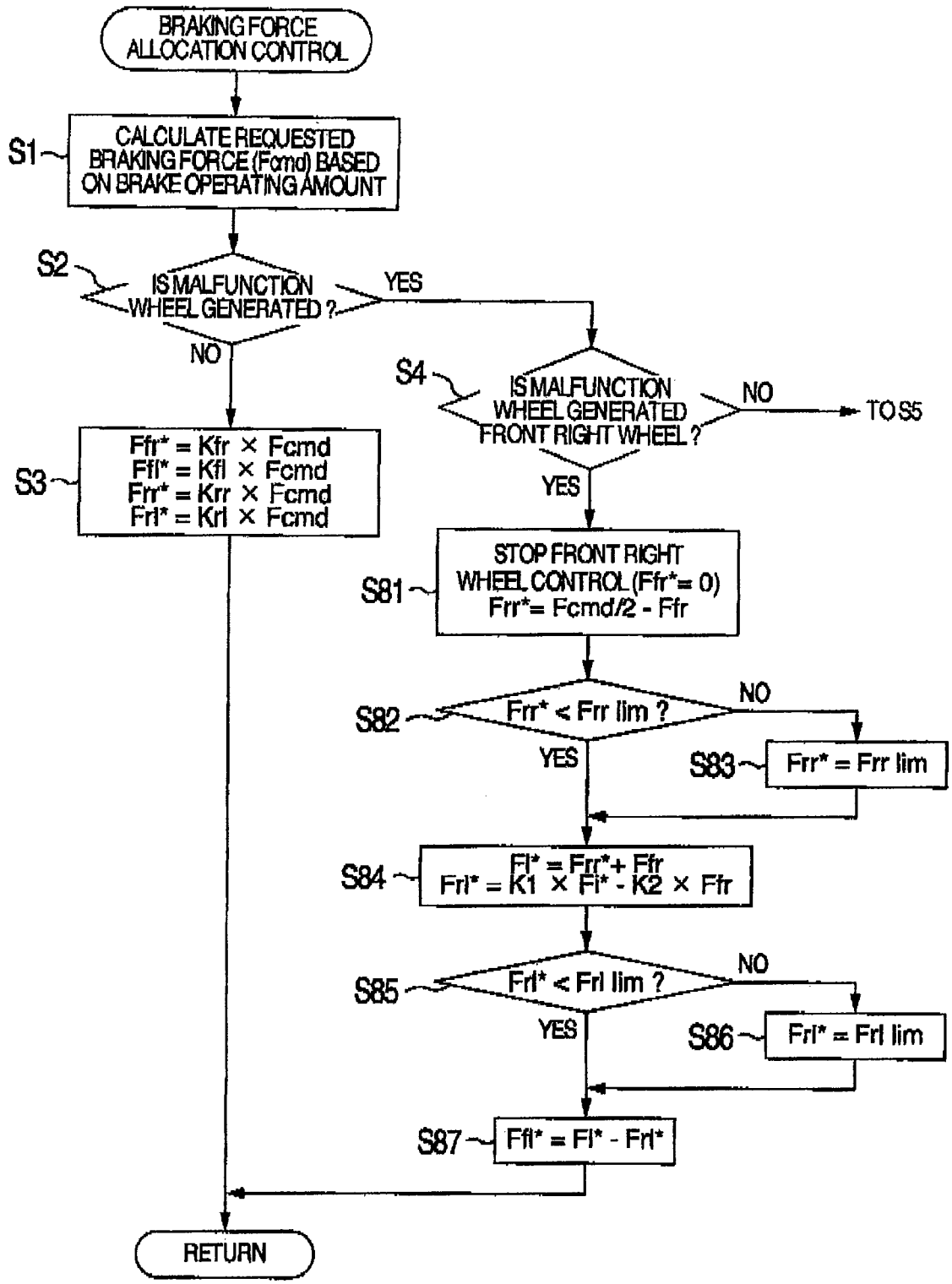
FIG. 7 is a control flow chart of the brake control apparatus in accordance with the embodiment of the present invention.

FIG. 7 shows a control flow chart of a brake control apparatus in accordance with an embodiment of the present invention.

A description will be given of an example of a specific method of calculating the target braking force generated in each of the wheels in accordance with the control mode of the steps S8 to S11, S22 and S23 in FIG. 6, in correspondence to the wheel under malfunction on the basis of the flow chart in FIG. 7 by exemplifying the case that the brake apparatus in the front right wheel breaks down. The steps S1 to S4 in FIG. 7 are the same as the steps S1 to S4 in FIG. 6, and the braking force allocation to each of the wheels in the normal brake is expressed by a specific expression in the step S3.

Steps S81 to S86 in FIG. 7 indicate a method of calculating the target braking force generated in each of the wheels, with regard to the front right wheel malfunction time control mode in the step S8 of FIG. 6.

In the case that the malfunction determination in the step S2 determines that the abnormality is not generated in the brake, the normal control mode in the step S3 allocates the requested braking force Fcmd to the front, rear, right and left wheels.

In this case, reference symbols described in FIG. 7 are defined. Reference symbol Ffr* denotes a target braking force generated by the motor-driven brake unit B1 in the front right wheel. The target braking force Ffr* is converted into a thrust force command value or a current command value to the unit B1, and the motor-driven brake unit B1 controls the motor on the basis of the thrust force command value or the current command value, and generates the braking force in the wheel W1. Reference symbols Ffl*, Frr* and Frl* respectively denote target braking forces for generating the braking force in the motor-driven brake units B2, B3 and B4 in the front left wheel the rear right wheel and the rear left wheel in the same manner. Further, reference symbol Fl* denotes a target braking force generated by the motor-driven brake units B2 and B4 in the left wheels.

Figure 9:
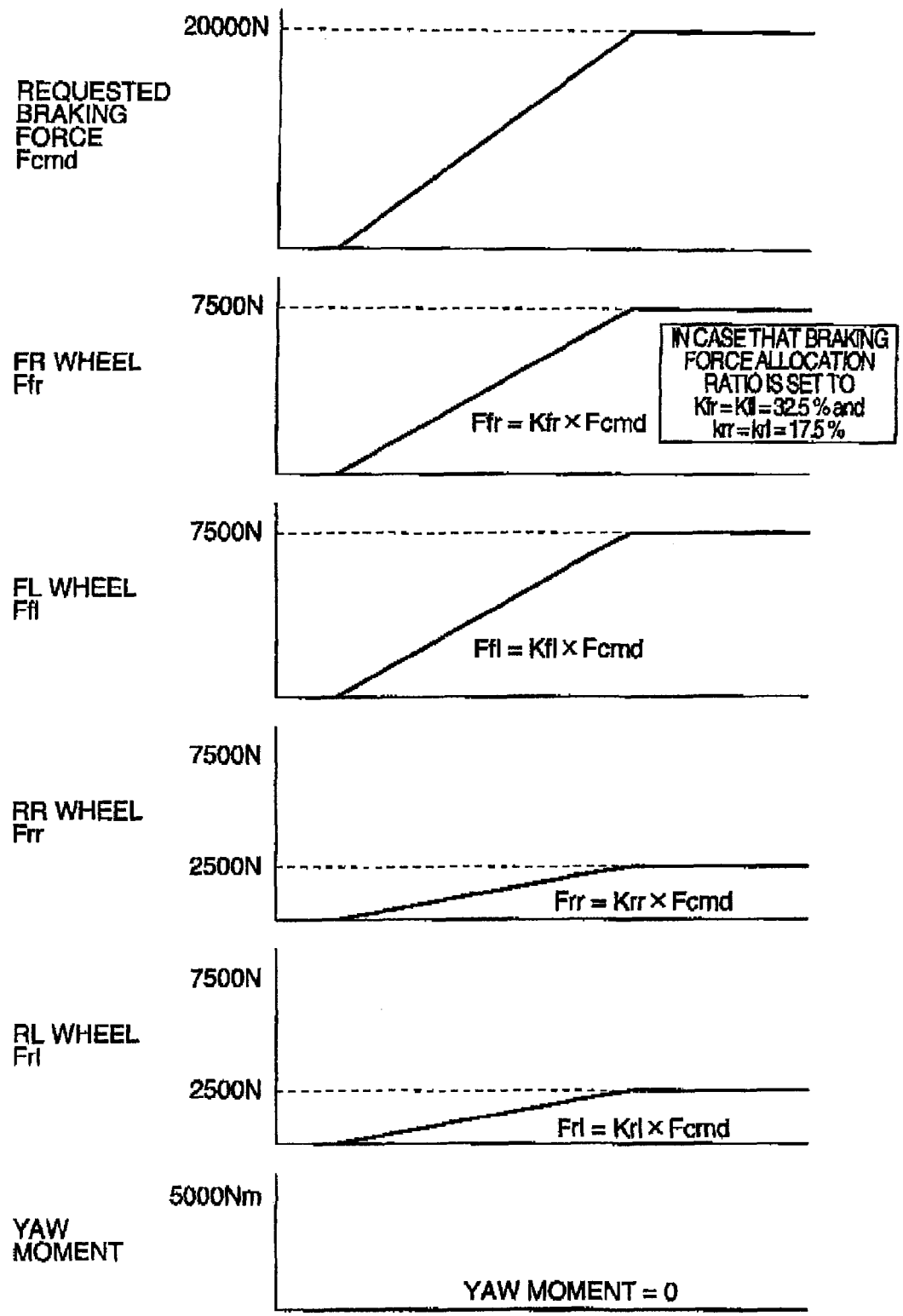
FIG. 9 is a view showing an example of results.

Reference symbols Kfr, Kfl, Krr and Krl respectively denote allocation ratios of the braking forces generated in the motor-driven brake units B1, B2, B3 and B4. The allocation ratios Kfr, Kfl, Krr and Krl are set such that a total thereof comes to 100% on the basis of a vehicle data. Generally, they are set such that a relation Kfr=Kfl and Krr=Krl is established and a ratio Kfr=Kfl:Krr=Krl is between 2:1 and 3:1. In this case, the ratios Kfr, Kfl, Krr and Krl may be varied in correspondence to a traveling state. FIG. 9 shows an example of a result obtained by controlling the braking force by the motor-driven brake units B1, B2, B3 and B4 in the respective wheels in the case of passing through the step S3 in the flow chart in FIG. 7. In this case, FIG. 9 shows the example in which Kfr=Kfl=32.5% and Krr=Krl=12.5% are set.

In the case that the step S2 determines that the abnormality is generated in the brake, the step S4 determines that the motor-driven brake unit B1 in the front right wheel is out of order, and in the case that the motor-driven brake unit B1 in the front right wheel is not out of order, the step goes to the step S5 in FIG. 7 on and after.

In the case that the motor-driven brake unit B1 in the front right wheel is out of order in the step S4, the steps S81 to S88 calculate the braking force generated in each of the wheels in accordance with the control mode for the case that the motor-driven brake unit B1 is out of order.

First, the step S81 stops the control of the motor-driven brake unit B1 in the front right wheel, and sets the target braking force Ffr* generated in the motor-driven brake unit B1 in the front right wheel equal to 0. Next, the step calculates the target braking force Frr* generated by the motor-driven brake unit B3 in the rear right wheel in accordance with the following expression, $$Frr^* = Fcmd/2 - Ffr \quad (1)$$

In this case, reference symbol Ffr denotes an actual braking force generated in the front right wheel. In the case of a system (hereinafter, refer to a mechanical backup) capable of generating the braking force by the pedaling force at a time when the motor-driven brake unit is controlled so as to stop, the braking force is generated even in the wheel in which the function of the motor-driven brake fails. Accordingly, it is possible to allocate such that the total of the braking forces generated by the right wheels W1 and W3 becomes equal to the total of the braking forces generated by the left wheels W2 and W4, by allocating the target braking force in such a manner as to set the total of the braking forces generated in the front right wheel W1 and the rear right wheel W3 to one half of the requested braking force Farad, and generate one half of the remaining requested braking force Fcmd by the front left wheel W2 and the rear left wheel W4, by subtracting the braking force Ffr on the basis of the mechanical backup of the wheel W1, at a time of calculating the target braking force Frr* generated by the motor-driven brake unit B3 in the rear right wheel in the expression 1. Of course, even in the motor-driven brake unit having no mechanical backup, since the relation Ffr*=0 is set at the beginning of the present step, the relation Ffr=0 is established, and there is obtained the target braking force allocation generated by dividing the requested braking force Fcmd into two equal parts by the motor-driven brake unit B3 in the rear right wheel, and the motor-driven brake units B2 and B4 in the left wheels, in accordance with the expression 1 and the expression 2. Further, in the expression 1, the Ffr is set to the actual braking force generated in the front right wheel, however, may employ an estimated braking force calculated on the basis of the pedaling force at a time of the mechanical backup.

The target braking force Frr* generated by the motor-driven brake unit B3 in the rear right wheel is calculated by the step S81, however, since there is a limit in the braking force capable of being generated by the motor-driven brake unit B3 in the rear right wheel and the braking force capable of being generated by the motor-driven brake unit B4 in the rear left wheel, the step S82 first determines whether or not the target braking force Frr* generated by the motor-driven brake unit B3 in the rear right wheel is within a range of a braking force limit Frr lim, and in the case that it is without the range, the step S83 limits the target braking force Frr* generated by the motor-driven brake unit B3 to the braking force limit Frr lim.

In this case, the braking force limit Frr lim of the motor-driven brake unit B3 may be set to a fixed value on the basis of the vehicle data, or may be set variable in correspondence to a vehicle traveling state and a road surface state. In this case, the step calculates on the basis of a relation among an estimated value of a road surface μ, a load in each of the wheels and an estimated lateral force. Further, it is possible to determine on the basis of a hydraulic pressure at a time when the right rear wheel W3 come to a lock tendency, or it is possible to determine by updating to be equal to or less than the main braking force on the basis of the braking force at a time when an ABS is operated.

In the case that the step 82 is within the range, or if the braking force of the motor-driven brake unit B3 is limited to the braking force limit Frr lim in the step S83, the step goes to the step S84.

The step S84 calculates a target braking force allocation Fl* generated by the motor-driven brake units B2 and B4 in the left wheels in accordance with the following expression (2).

$$Fl^* = Fcmd/2 \quad (2)$$

Next, the step S84 allocates the target braking force Fl* generated by the motor-driven brake units B2 and B4 in the left wheels to the target braking force Ffl* generated by the motor-driven brake unit B2 in the front left wheel and the target braking force Frl* generated by the motor-driven brake unit B4 in the rear left wheel. In this case, in the present embodiment, a description will be first given of a case of calculating from the target braking force Frl* generated in the motor-driven brake unit B4 in the rear left wheel. The target braking force Frl* generated by the motor-driven brake unit B4 in the rear left wheel is calculated in accordance with the following expression.

$$Frl^* = K1 \times Fcmd/2 - K2 \times Ffr \quad (3)$$

In this case, Ffr employs the same value as the expression 1 of the step S81. Reference symbols K1 and K2 denote a proportion coefficient equal to or more than 0 and equal to or less than 1. In the case that K1=0 and K2=2, a rate of the target braking force generated by the wheel W4 in the target braking force generated by the left wheels W2 and W4 comes to 100%. Further, in the case that K1=0 and K2=0, the rate of the target braking force generated by the wheel W4 in the target braking force generated by the left wheels W2 and W4 comes to 50%. Further, in the case that K1=1 and K2=1, Frl* of the expression 3 and Frr* of the expression 1 come to the same expression, and the target braking force generated by the rear left wheel and the rear right wheel becomes equal to the requested braking force. In this case, in the relation between K1 and K2, it is necessary to prevent a relation $K1 \times Fcmd/2 < K2 \times Ffr$. As mentioned above, if the target braking force Frl* generated by the motor-driven brake unit B4 in the rear left wheel is calculated in the step S84, the step goes to the step S85

In the step S85, since there is a limit in the braking force capable of being generated by the motor-driven brake unit B4 in the rear left wheel with regard to the target braking force Frl* generated by the motor-driven brake unit B4 in the rear left wheel calculated in the step S84, in the same manner as the rear right wheel, the steps S85 and S86 limits the target braking force Frl* generated by the motor-driven brake unit B4 in the rear left wheel to be equal to or less than the braking force limit Frl lim of the motor-driven brake unit B4, in the same manner as the steps S82 and S83.

Next, the step S87 calculates the target braking force Ffl* generated by the motor-driven brake unit B2 in the front left wheel in accordance with the following expression.

$$Ffl^* = Fl^* - Frl^* \quad (4)$$

There is obtained such a target braking force allocation that the short braking force of the target braking force Frl* generated by the motor-driven brake unit B4 in the rear left wheel is generated by the motor-driven brake unit B2 in the front left wheel, with respect to the target braking force Fl* generated by the motor-driven brake units B2 and B4 in the left wheel, by calculating the braking force Ffl* in accordance with the expression 4.

As mentioned above, on the basis of the steps S84 to S87 of the flow chart in FIG. 7, in the case that the target braking force Frr* generated by the motor-driven brake unit B2 in the rear right wheel is equal to or less than the braking force limit Frl lim, it is possible to control such that the total of the braking forces in four wheels comes to the requested braking force, and it is possible to allocate such as to make the total of the braking forces generated by the right wheels W1 and W3 equal to the total of the braking forces generated in the left wheels W2 and W4. Further, even in the case that the target braking force Frr* generated by the motor-driven brake unit B2 in the rear right wheel gets over the braking force limit Frr lim, it is possible to allocate such as to make the total of the braking forces generated by the right wheels W1 and W3 equal to the total of the braking forces generated in the left wheels W2 and W4, although the requested braking force can not be satisfied.

Figure 8:
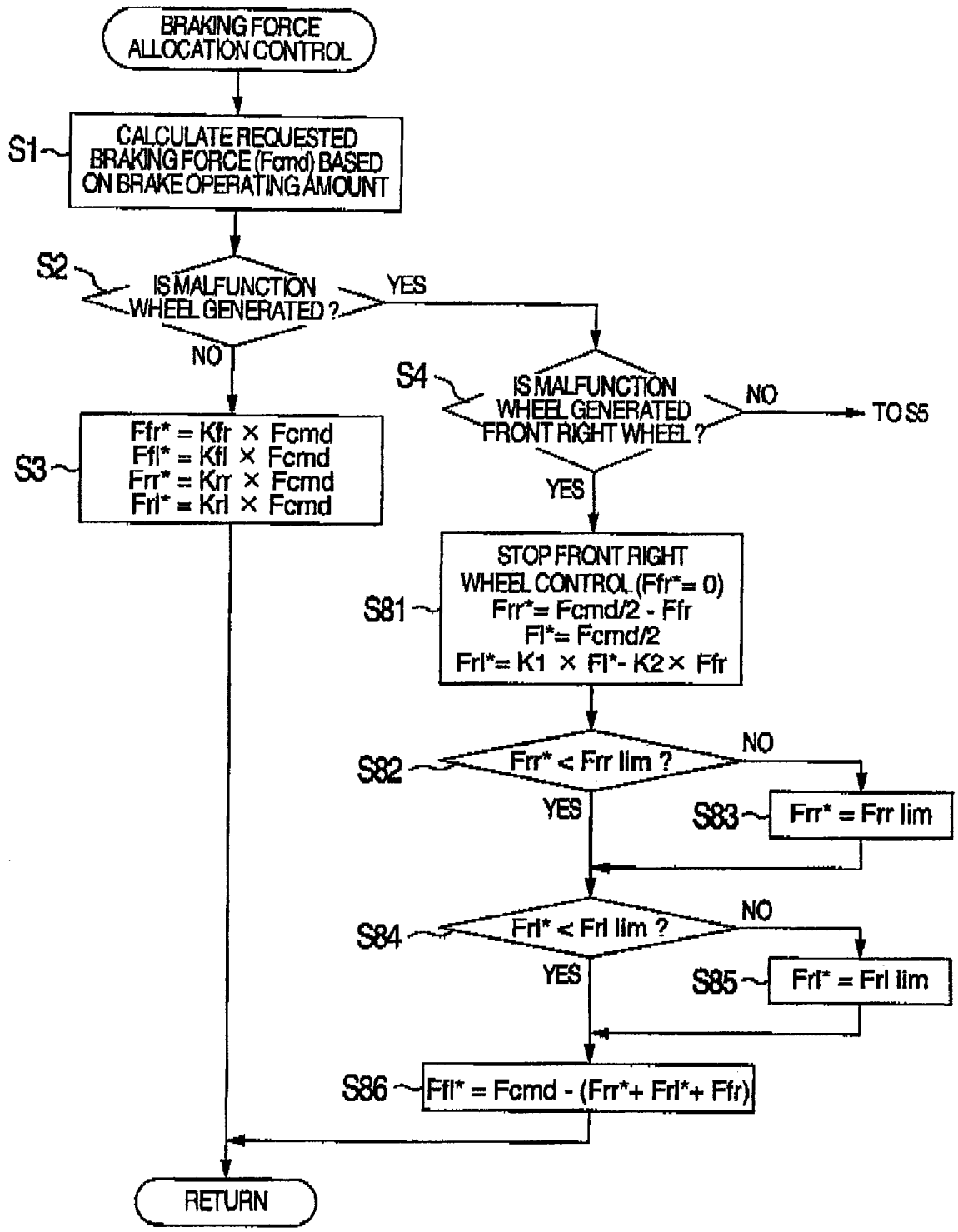
FIG. 8 is a control flow chart of the brake control apparatus in accordance with the embodiment of the present invention.

Further, the description is given above of the control mode for the front right wheel malfunction time in the step S8 of FIG. 6, however, the same logic as FIG. 8 can be applied to the control mode for the front left wheel, rear right wheel and rear left wheel malfunction time in the steps S9 to S11 of FIG. 6.

FIG. 8 is a view showing a flow chart of the brake control apparatus.

A case that the brake apparatus in the front right wheel is out of order is exemplified as one example of a specific method of calculating the target braking force generated in each of the wheels by the control mode in the steps S8 to S11, S22 and S23 of FIG. 6 in correspondence to the wheel under malfunction, and is described in accordance with a flow chart in FIG. 8. The steps S1 to S4 in FIG. 8 are the same as the steps S1 to S4 in FIG. 6, and the braking force allocation to each of the wheels in the normal brake is expressed by a specific expression in the step S3.

The steps S81 to S86 in FIG. 8 indicate one example of a method of calculating the target braking force generated in each of the wheels, with regard to the control mode for the front right wheel malfunction in the step S8 of FIG. 6.

In the case that the malfunction determination in the step S2 determines that the abnormality is not generated in the brake, the normal control mode in the step S3 allocates the requested braking force Fcmd to the front, rear, right and left wheels.

In this case, reference symbols described in FIG. 8 are defined. Reference symbol Ffr* denotes a target braking force generated by the motor-driven brake unit B1 in the front right wheel. The target braking force Ffr* is converted into a thrust force command value or a current command value to the unit B1, and the motor-driven brake unit B1 controls the motor on the basis of the thrust force command value or the current command value, and generates the braking force in the wheel W1. Reference symbols Ffl*, Frr* and Frl* respectively denote target braking forces for generating the braking force in the motor-driven brake units B2, B3 and B4 in the front left wheel the rear right wheel and the rear left wheel in the same manner. Reference symbols Kfr, Kfl, Krr and Krl respectively denote allocation ratios of the braking forces generated in the motor-driven brake units B1, B2, B3 and B4. The allocation ratios Kfr, Kfl, Krr and Krl are set such that a total thereof comes to 100% on the basis of a vehicle data. Generally, they are set such that a relation Kfr=Kfl and Krr=Krl is established and a ratio Kfr=Kfl:Krr=Krl is between 2:1 and 3:1. In this case, the ratios Kfr, Kfl, Krr and Krl may be varied in correspondence to a traveling state. FIG. 9 shows an example of a result obtained by controlling the braking force by the motor-driven brake units B1, B2, B3 and B4 in the respective wheels in the case of passing through the step S3 in the flow chart in FIG. 8. In this case, FIG. 9 shows the example in which Kfr=Kfl=32.5% and Krr=Krl=12.5% are set.

In the case that the step S2 determines that the abnormality is generated in the brake, the step S4 determines that the motor-driven brake unit B1 in the front right wheel is out of order, and in the case that the motor-driven brake unit B1 in the front right wheel is not out of order, the step goes to the step S5 in FIG. 8 on and after.

In the case that the motor-driven brake unit B1 in the front right wheel is out of order in the step S4, the steps S81 to S88 calculate the braking force generated in each of the wheels in accordance with the control mode for the case that the motor-driven brake unit B1 is out of order.

First, the step S81 stops the control of the motor-driven brake unit B1 in the front right wheel, and sets the target braking force Ffr* generated in the motor-driven brake unit B1 in the front right wheel equal to 0. Next, the step calculates the target braking force Frr* generated by the motor-driven brake unit B3 in the rear right wheel, and a total F1* of the target braking forces generated by the motor-driven brake unit B2 in the front left wheel and the motor-driven brake unit B4 in the rear left wheel, respectively in accordance with the following expressions $$Frr^* = Fcmd/2 - Ffr \qquad (5)$$

$$F1^* = Fcmd/2 \qquad (6)$$

In this case, reference symbol Ffr denotes an actual braking force generated in the front right wheel. In the case of a system (hereinafter, refer to a mechanical backup) capable of generating the braking force by the pedaling force at a time when the motor-driven brake unit is controlled so as to stop, the braking force is generated even in the wheel in which the function of the motor-driven brake fails. Accordingly, it is possible to allocate such that the total of the braking forces generated by the right wheels W1 and W3 becomes equal to the total of the braking forces generated by the left wheels W2 and W4, by allocating the target braking force in such a manner as to set the total of the braking forces generated in the front right wheel W1 and the rear right wheel W3 to one half of the requested braking force Fcmd, and generate one half of the remaining requested braking force Fcmd by the front left wheel W2 and the rear left wheel W4, by subtracting the braking force Ffr on the basis of the mechanical backup of the wheel W1, at a time of calculating the target braking force Frr* generated by the motor-driven brake unit 13 in the rear right wheel in the expression 5. Of course, even in the motor-driven brake unit having no mechanical backup, since the relation Ffr*=0 is set at the beginning of the present step, the relation Ffr=0 is established, and there is obtained the target braking force allocation generated by dividing the requested braking force Fcmd into two equal parts by the motor-driven brake unit B3 in the rear right wheel, and the motor-driven brake units B2 and B4 in the left wheels, in accordance with the expression 5 and the expression 6. Further, in the expression 5, the Ffr is set to the actual braking force generated in the front right wheel, however, may employ an estimated braking force calculated on the basis of the pedaling force at a time of the mechanical backup.

Thereafter, the step allocates a target braking force allocation F1* generated by the motor-driven brake units B2 and B4 in the left wheels to the target braking force Ffl* generated by the motor-driven brake unit B2 in the front left wheel and the target braking force Frl* generated by the motor-driven brake unit B4 in the rear left wheel. However, in the present embodiment, a description will be first given of a case of calculating from the target braking force Frl* generated in the motor-driven brake unit B4 in the rear left wheel. The target braking force Frl* generated by the motor-driven brake unit B4 in the rear left wheel is calculated in accordance with the following expression.

$$Frl^* = K1 \times Fcmd/2 - K2 \times Ffr \qquad (7)$$

In this case, Ffr employs the same value as the expression 5 of the step S81. Reference symbols K1 and K2 denote a proportion coefficient equal to or more than 0 and equal to or less than 1. In the case that K1=0 and K2=2, a rate of the target braking force generated by the wheel W4 in the target braking force generated by the left wheels W2 and W4 comes to 100%. Further, in the case that K1=0 and K2=0, the rate of the target braking force generated by the wheel W4 in the target braking force generated by the left wheels W2 and W4 comes to 50%. Further, in the case that K1=1 and K2=1, Frl* of the expression 7 and Frr* of the expression 5 come to the same expression, and the target braking force generated by the rear left wheel and the rear right wheel becomes equal to the requested braking force. In this case, in the relation between K1 and K2, it is necessary to prevent a relation $K1 \times Fcmd/2 < K2 \times Ffr$.

The target braking force Frr* generated by the motor-driven brake unit B3 in the rear right wheel is calculated in the step S81, however, since there is a limit in the braking force capable of being generated by the motor-driven brake unit B3 in the rear right wheel and the braking force capable of being generated by the motor-driven brake unit B4 in the rear left wheel, the step S82 first determines whether or not the target braking force Frr* generated by the motor-driven brake unit B3 in the rear right wheel is within the range of the braking force limit Frr lim, and in the case that it is out of the range, the step S83 limits the target braking force Frr* generated by the motor-driven brake unit B3 to the braking force limit Frr lim.

In this case, the braking force limit Frr lim of the motor-driven brake unit B3 may be set to a fixed value on the basis of the vehicle data, or may be set variable in correspondence to the vehicle traveling state and the road surface state. In this case, the step calculates on the basis of a relation among an estimated value of a road surface μ, a load in each of the wheels and an estimated lateral force. Further, it is possible to determine on the basis of a hydraulic pressure at a time when the right rear wheel W3 come to a lock tendency, or it is possible to determine by updating to be equal to or less than the main braking force on the basis of the braking force at a time when an ABS is operated.

In the case that the step 82 is within the range, or if the braking force of the motor-driven brake unit B3 is limited to the braking force limit Frr lim in the step S83, the step goes to the step S84.

In the same manner as the rear right wheel, since there is a limit in the braking force capable of being generated by the motor-driven brake unit B4 in the rear left wheel with regard to the target braking force Frl* generated by the motor-driven brake unit B4 in the rear left wheel calculated by the step S81, the steps S84 and S85 limit the target braking force Frl* generated by the motor-driven brake unit B4 in the rear left wheel in such a manner as to become equal to or less than the braking force limit Frl lim of the motor-driven brake unit B4, in the same manner as the steps S82 and S83.

Next, the step S86 calculates the target braking force Ffl* generated by the motor-driven brake unit B2 in the front left wheel in accordance with the following expression.

$$Ffl^* = Fcmd - (Frr^* + Frl^* + Ffr) \quad (8)$$

In this case, the target braking force Ffl* generated by the motor-driven brake unit B2 in the front left wheel generates the short braking force in the braking force generated b the other three wheels with respect to the requested braking force Fcmd, by using the same value as the expression 5 and the expression 7 in the step S81 for the value Ffr in the expression 8.

In the case that the target braking force Frr* generated by the motor-driven brake unit B2 in the rear right wheel calculated by the expression 5 in the step S1 is equal to or less than Frr lim, the total of the target braking forces generated by the wheels W1 and W3 in the right aide of the vehicle becomes equal to the total of the target braking forces generated by the wheels W2 and W4 in the left side of the vehicle, by calculating the target braking force Ffl* generated by the motor-driven brake unit B2 in the front left wheel as shown by the expression 8. In the case that the target braking force Frr* generated by the motor-driven brake unit B2 in the rear right wheel gets over Frr lim, the braking force obtained by Frr lim–Frr* is compensated by the target braking force Frl* generated by the motor-driven brake unit B2 in the front left wheel, and it is possible to control such that the total of the braking forces in four wheels comes to the requested braking force, until the limit of the braking force generated in the front left wheel.

Figure 10:
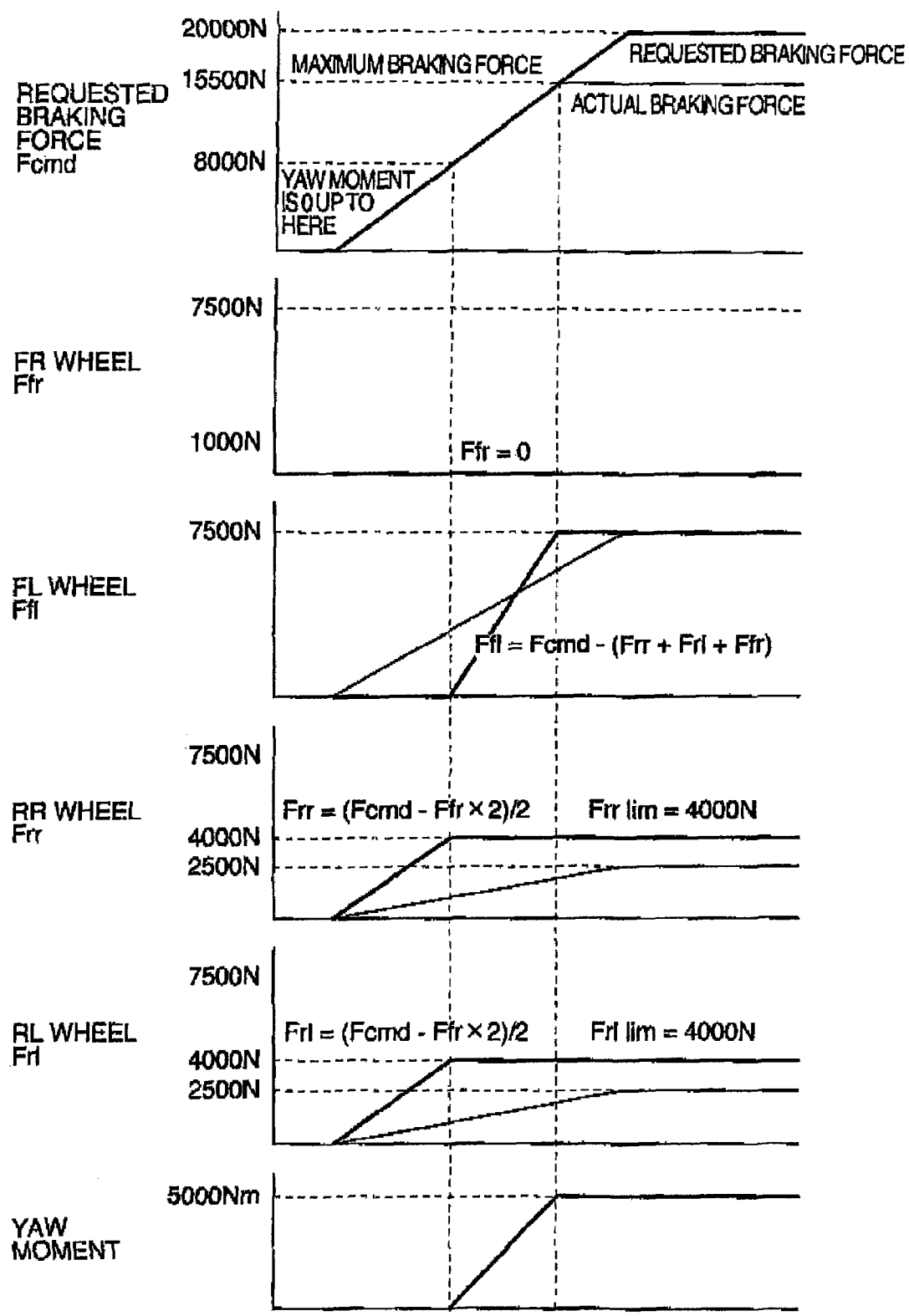
FIG. 10 is a view showing an example of a relation of a yaw moment in FIG. 8.
Figure 11:
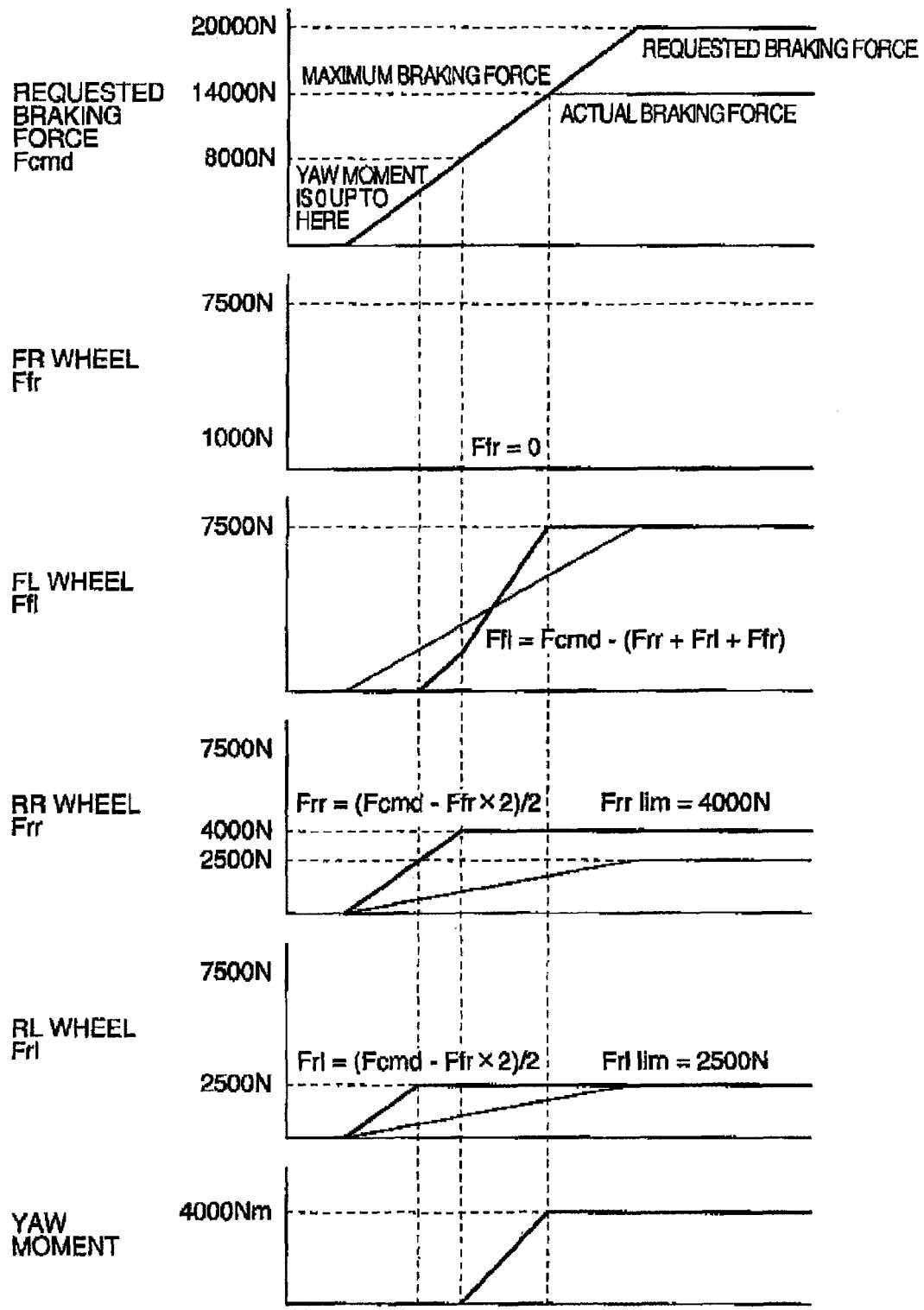
FIG. 11 is a view showing an example of a relation of a yaw moment in FIG. 8.
Figure 12:
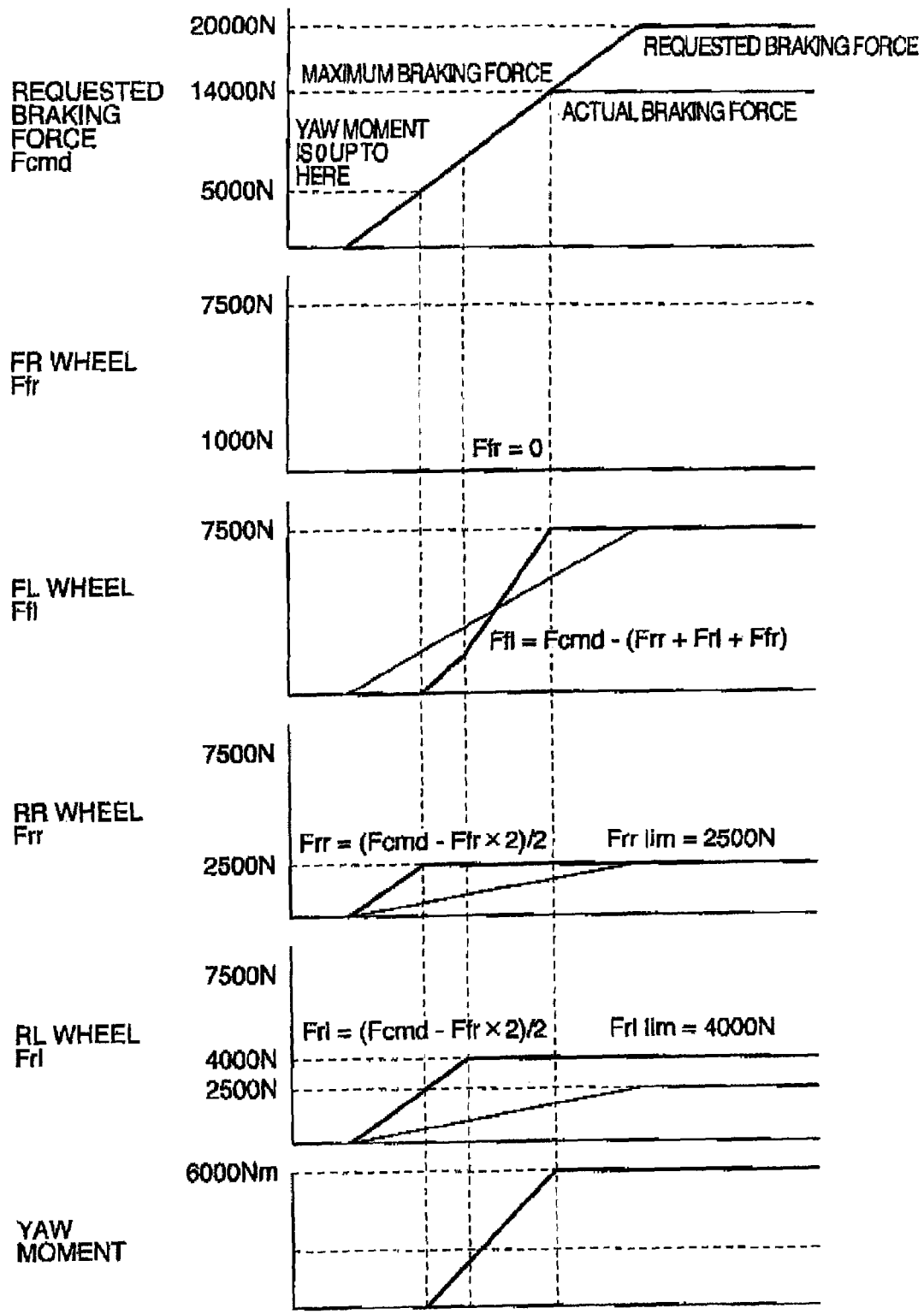
FIG. 12 is a view showing an example of a relation of a yaw moment in FIG. 8.

As an example of a result obtained by controlling the braking force by the motor-driven brake units B1, B2, B3 and B4 in the respective wheels in the case of passing through the steps S81 to S86 in the flow chart in FIG. 8, FIGS. 10, 11 and 12 show a relation between the braking force in each of the wheels with respect to the requested braking force, and the yaw moment generated by the difference between the right and left braking forces. They show the example in which the relation K1=1 and K2=0 is established, and the mechanical backup is not provided, FIG. 10 shows the case of Frr lim Frl lim=4000 N, FIG. 11 shows the case of Frr lim=4000 N and Frl lim=2500 N, and FIG. 12 shows the case of Frr lim=2500 N and Frl lim=4000 N. In this case, the limit Ffl lim of the braking force in the front left wheel is assumed as 7500 N.

In any cases, it is possible to generate the braking force in such a manner as to satisfy the requested braking force to the maximum braking force capable of being generated by the normal wheel.

Further, it is possible to make the braking force generated in the right wheel of the vehicle equal to the braking force generated in the left wheel, until the requested braking force which is twice the braking force limit generated in the wheel in the same lateral direction as the wheel under malfunction.

Further, even in the case that the requested braking force gets over twice the braking force limit generated in the wheel in the same lateral direction as the wheel under malfunction, it is possible to increase the braking force in the wheel in the opposite lateral direction to the wheel under malfunction in such a manner as to satisfy the requested braking force.

Further, in the present embodiment, in the case that the front right wheel fails, there is formed a logic such that the braking forces in the rear right wheel and the rear left wheel become as equal as possible by setting K1=1.

In this case, if K=0 is set, there is obtained a logic such that the braking forces in the rear right wheel and the front left wheel become as equal as possible. However, in this case, even if the front left wheel reaches the braking force limit, it is impossible to compensate the difference between the requested braking force and the target braking force by the rear left wheel. Accordingly, in the logic of replacing Frl* and Ffl* from the steps S81 to S86 of the flow chart in FIG. 8, in the case that the front left wheel reaches the braking force limit, it is possible to compensate the difference between the requested braking force and the target braking force by the rear left wheel. Even in this case, the relation of the yaw moment generated on the basis of the right and left braking force difference with respect to the requested braking force Fcmd is the same as the cases of FIGS. 10, 11 and 12.

As mentioned above, in the case that the motor-driven brake unit B1 in the front right wheel is out of order such as the steps S81 to S86, there is obtained such a control mode as to prevent the unnecessary yaw moment from being generated and suppress the reduction of the maximum braking force, by calculating the target braking forces Ffl*, Frr* and Frl* generated in the respective normal wheels in such a manner that the braking forces in the right wheels becomes as equal as possible to the braking force in the left wheels with respect to the vehicle moving direction.

Further, the above description is given of the control mode for the control mode for the front right wheel malfunction time in the step S8 in FIG. 6, however, it is possible to apply to the control modes for the front left wheel malfunction time, the rear right wheel malfunction time and the rear left wheel malfunction time from the steps S9 to S11 in FIG. 6 on the basis of the same logic as FIG. 8.

Next, a description will be given of the control mode for the brake apparatus malfunction time in the front right wheel and the rear left wheel in the step S22 in FIG. 6.

Figure 13:
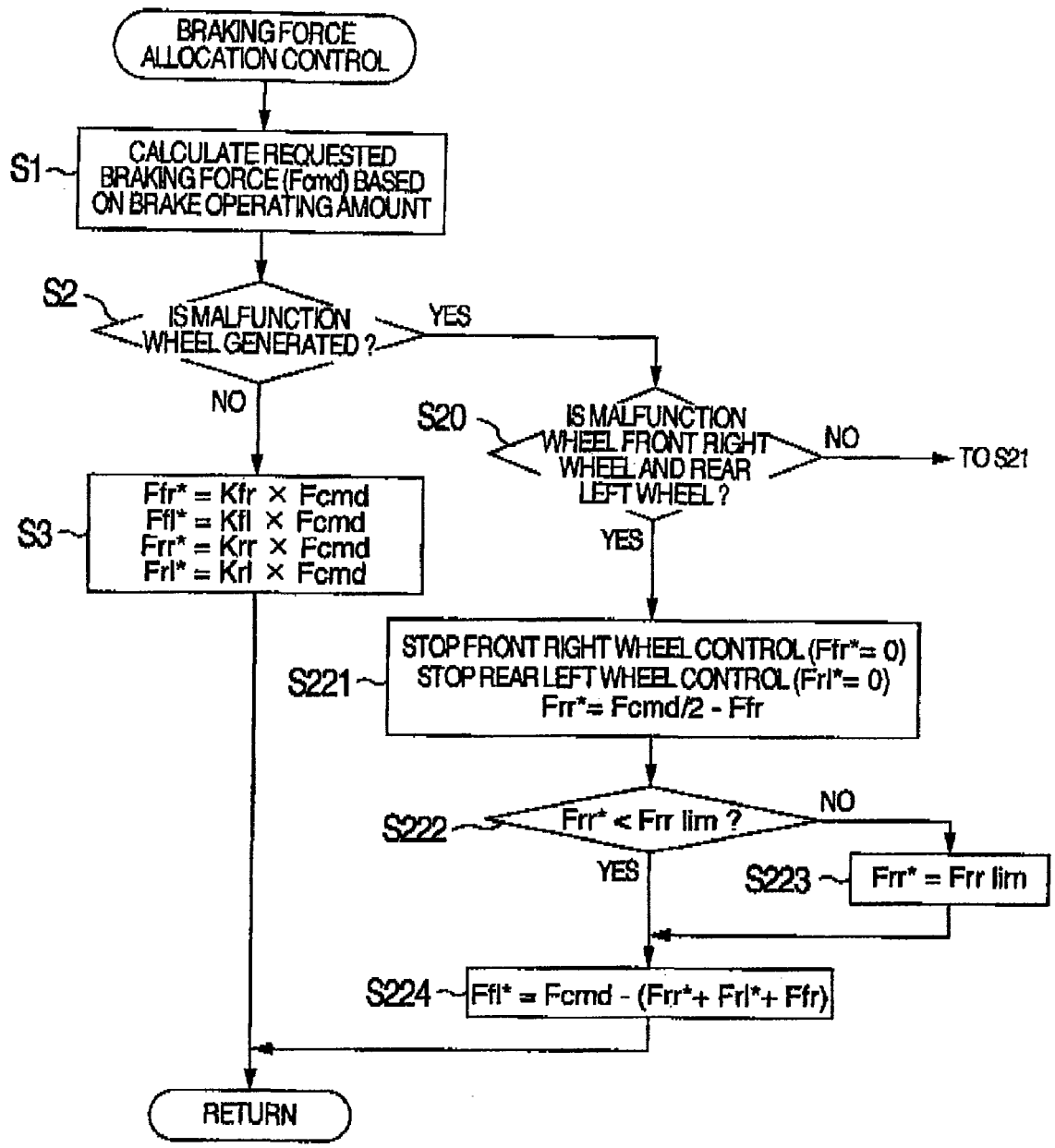
FIG. 13 is a flow chart of a brake control apparatus in accordance with an embodiment of the present invention.

FIG. 13 shows a flow chart of a brake control apparatus in accordance with an embodiment of the present invention.

A description will be given of a case that the brake apparatuses in the front right wheel and the rear left wheel are out of order, on the basis of a flow chart in FIG. 13, as an example of a specific method of calculating the target braking force generated in each of the wheels in accordance with the control mode in the steps S8 to S11, S22 and S23 in FIG. 6, in correspondence to the wheel under malfunction. Since the steps S1 to S3 and S20 in FIG. 13 are the same as the steps S1 to S3 and S20 in FIG. 6, and the steps S1 to S3 are the same as the steps S1 to S3 in FIG. 8, a description thereof will be omitted.

Steps S221 to S224 in FIG. 13 indicate a specific method of calculating the target braking force generated in each of the wheels, with regard to the front right and rear left wheels malfunction time control mode in the step S22 of FIG. 6.

In the case that the motor-driven brake units B1 and B4 in the front right wheel and the rear left wheel are out of order in the step S20, the steps S221 to S224 calculate the braking force generated in each of the wheels in accordance with the control mode for the case that the motor-driven brake units B1 and B4 are out of order.

First, the step S221 stops the control of the motor-driven brake units B1 and B4 in the front right wheel and the rear left wheel, and sets the target braking force Ffr* generated in the motor-driven brake unit B1 in the front right wheel equal to 0 and sets the target braking force generated in the motor-driven brake unit B4 in the rear left wheel to 0. Next, the step calculates the target braking force Frr* generated by the motor-driven brake unit B3 in the rear right wheel in accordance with the following expression.

$$Frr^* = Fcmd/2 - Ffr \quad (9)$$

The method of calculating the target braking force Frr* generated by the motor-driven brake unit B3 in the rear right wheel in accordance with the expression 9 is the same as the step S81 in FIG. 8.

Next, since the steps S222 and S223 are respectively the same as the steps S82 and S83 in FIG. 8, a description thereof will be omitted. In the case that the target braking force Frr* generated by the motor-driven brake unit B3 in the rear right wheel is within the range of the braking force limit Frr lim in the step S222, or if the braking force of the motor-driven brake unit B3 is limited to the braking force limit Frr lim in the step S223, the step goes to the step S224.

The step S224 calculates the target braking force Ffl* generated by the motor-driven brake unit B2 in the front left wheel in accordance with the following expression 10.

$$Ffl^* = Fcmd - (Frr^* + Frl + Ffr) \quad (10)$$

In accordance with the expression 10, the target braking force Ffl* generated by the motor-driven brake unit B2 in the front left wheel generates the short braking force in the braking force generated by the other three wheels, with respect to the requested braking force Fcmd.

As mentioned above, with respect to the front right and rear left wheel malfunction time control mode in the step S22 in FIG. 6, the total of the target braking forces generated by the wheels W1 and W3 in the right side of the vehicle becomes equal to the total of the target braking forces generated by the wheels W2 and W4 in the left side of the vehicle, in the case that the target braking force Frr* generated by the motor-driven brake unit B2 in the rear right wheel calculated by the step S221 is equal to or less than Frr lim, by setting a logic from the step S221 to the step S224 in FIG. 13. In the case that the target braking force Frr* generated by the motor-driven brake unit B2 in the rear right wheel gets over the value Frr lim, the braking force obtained by the expression Frr lim−Frr* is compensated by the target braking force Ffl* generated by the motor-driven brake unit B2 in the front left wheel, and it is possible to control such that the total of the braking forces in four wheels comes to the requested braking force, to the limit of the braking force generated in the front left wheel.

Figure 14:
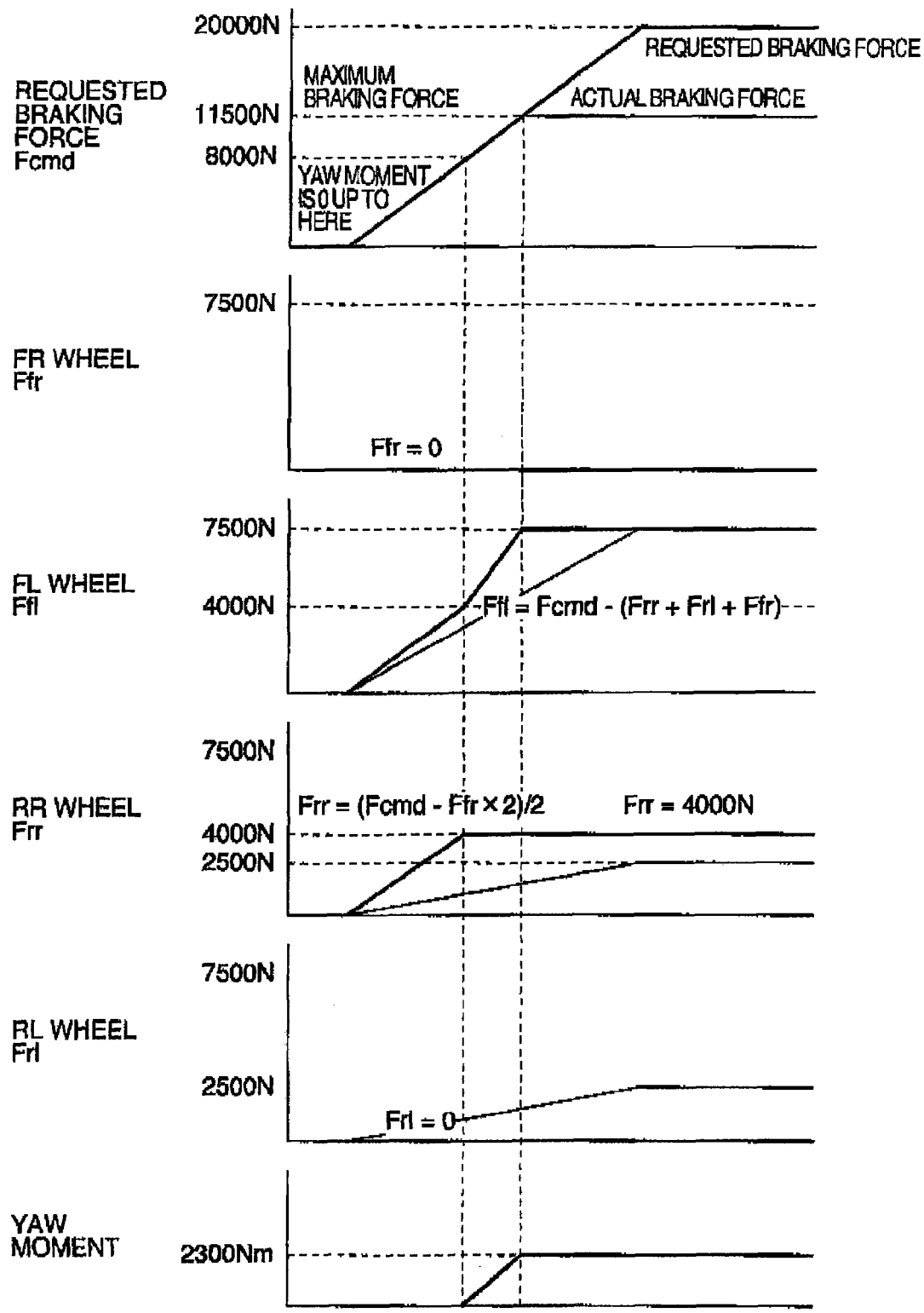
FIG. 14 is a view showing an example of a relation of a yaw moment in FIG. 13.

As one example of a result obtained by controlling the braking force by the motor-driven brake units B1, B2, B3 and B4 in the respective wheels in the case of passing through the step S226 from the step S221 in the flow chart in FIG. 13, FIG. 14 shows a relation between the braking force in each of the wheels with respect to the requested braking force and the yaw moment generated by the difference between the right and left braking forces. In this case, FIG. 14 shows a case of Frr lim=4000 N in the system provided with no mechanical backup, and the limit Ffl lim of the braking force in the front left wheel is assumed as 7500 N.

In accordance with FIG. 14, it is known that it is possible to generate the braking force in such a manner as to satisfy the requested braking force to the maximum braking force capable of being generated by the normal wheel, and it is possible to make the braking force generated by the vehicle right wheels equal to the braking force generated by the vehicle left wheels to the requested braking force which is twice the braking force limit generated by the wheels in the same lateral direction as the wheel under malfunction.

Further, even in the case that the requested, braking force gets over twice the braking force limit generated by the wheels in the same lateral direction as the wheel under malfunction, it is possible to increase the braking force of the wheel in the opposite lateral direction to the wheel under malfunction in such a manner as to satisfy the requested braking force.

As mentioned above, in the case that the motor-driven brake units B1 and B2 in the front right wheel and the rear left wheel fail their function such as the steps S221 to S224 in FIG. 13, there is formed such a control mode as to prevent the unnecessary yaw moment from being generated and suppress the reduction of the maximum braking force, by calculating the target braking force Ffl* and Frr* generated in the respective normal wheels in such a manner as to make the braking force in the right wheels as equal as possible to the braking force in the left wheels with respect to the moving direction of the vehicle and to satisfy the requested braking force.

Further, the above description is given of the control mode for the front right wheel and rear left wheel malfunction time in the step S22 in FIG. 6, however, it is possible to apply to the control mode for the front left wheel and rear right wheel malfunction time on the basis of the same logic as FIG. 13.

Figure 15:
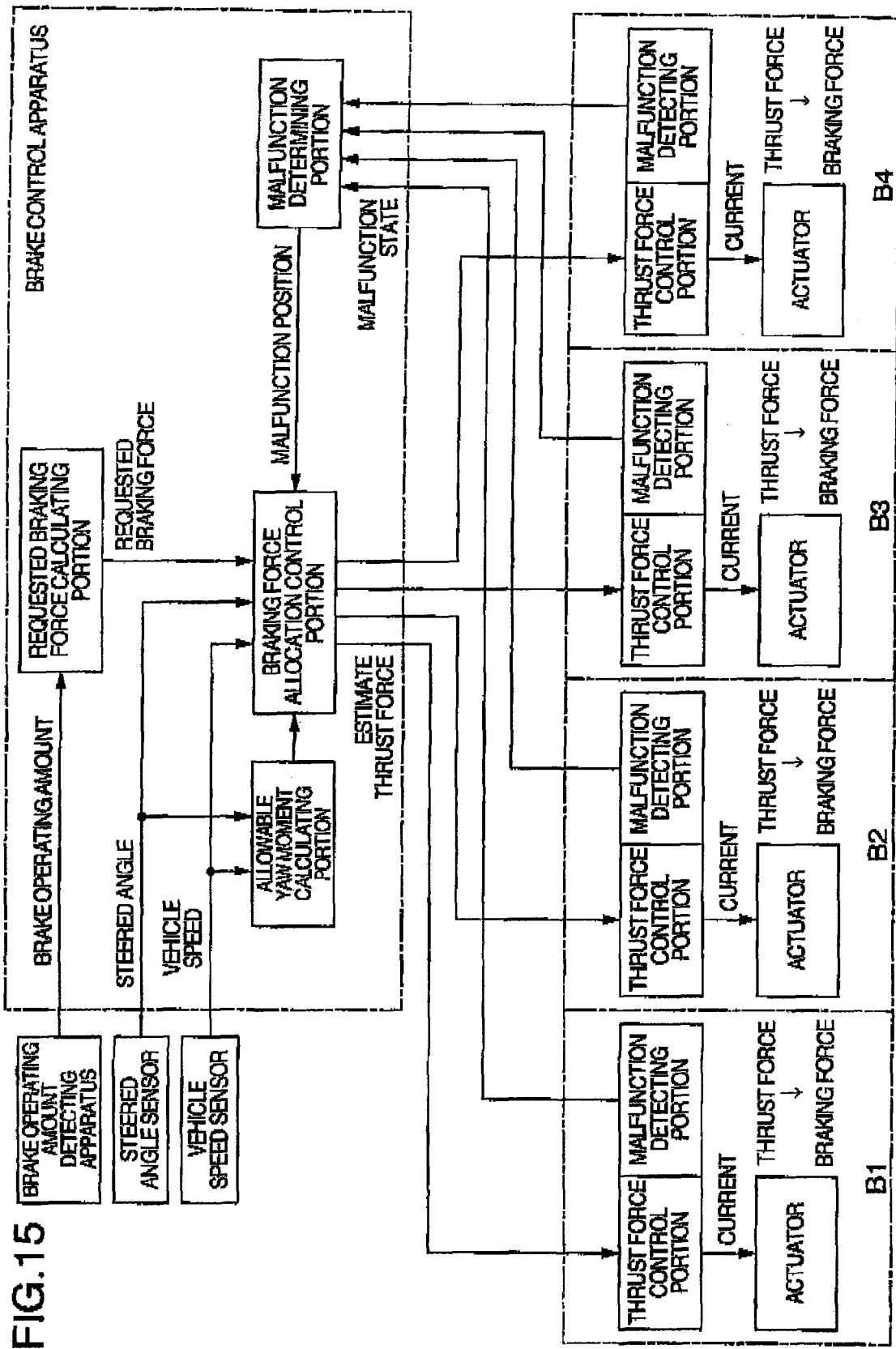
FIG. 15 is a view showing a control block structure of a brake control apparatus in accordance with the other embodiment of the present invention.
Figure 16:
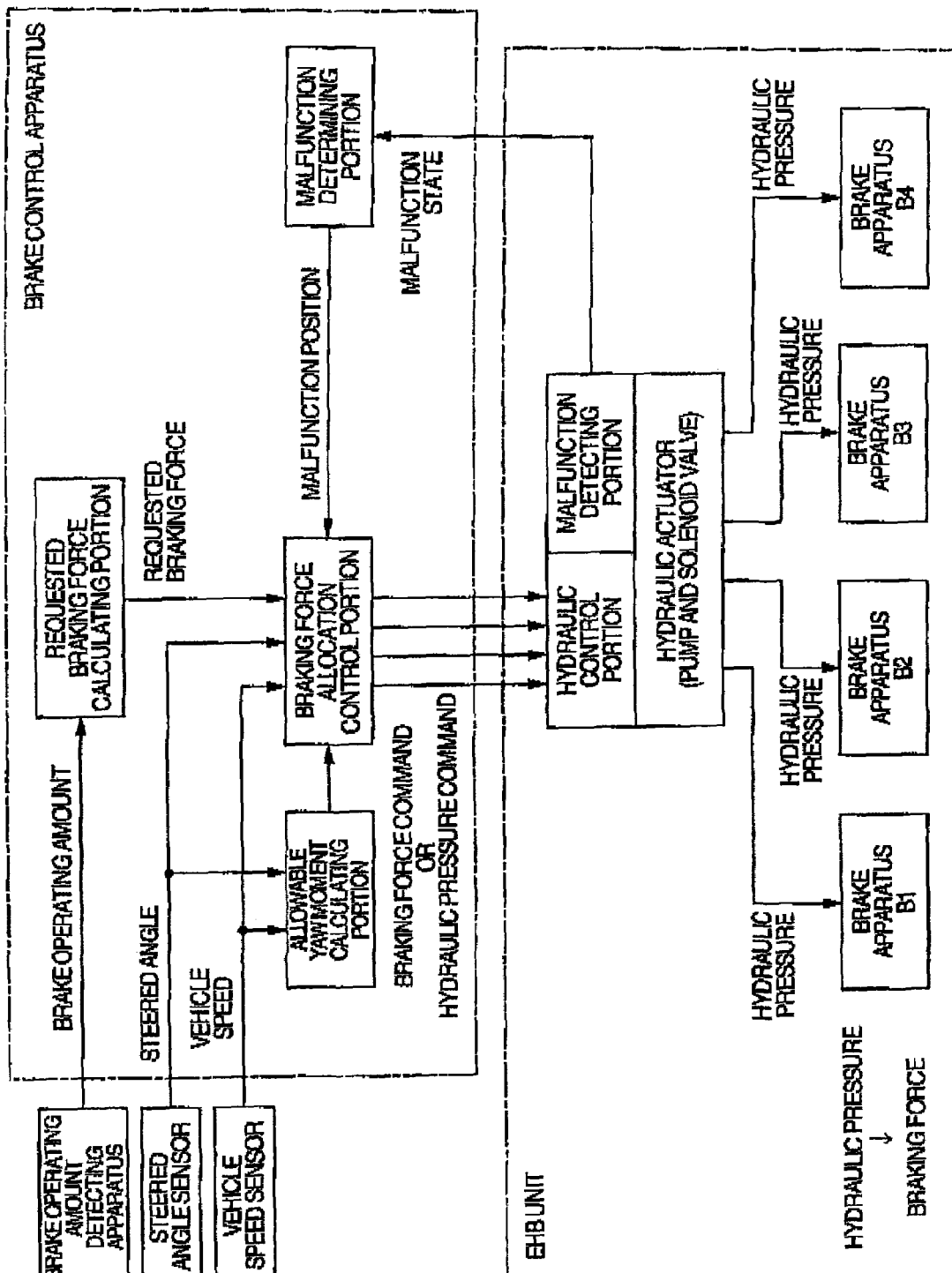
FIG. 16 is a view showing a control block structure of a brake control apparatus in accordance with the other embodiment of the present invention.

FIGS. 15 and 16 show a control block structure of a brake control apparatus in accordance with the other embodiment of the present invention.

In the requested braking force calculating portion, the requested braking force Fcmd of the driver is calculated on the basis of the brake operating amount detected by the brake operating amount detecting apparatus 3.

The malfunction determining portion determines which wheel is out of order, on the basis of the malfunction state from the malfunction detecting portion in each of the motor-driven brake units.

The allowable yaw moment calculating portion calculates the allowable value of the actual yaw moment which does not disarrange the vehicle behavior on the basis of at least one of the vehicle speed and the steered angle.

The braking force allocation control portion allocates the requested braking force Fcmd to the target braking force generated in each of the wheels on the basis of the malfunction position from the malfunction determining portion so as to convert into the thrust force command value generated by the motor-driven brake unit. In this case, the present braking force allocation control portion refers to the allowable yaw moment calculated in the allowable yaw moment calculating portion, and calculates the target braking force generated in each of the wheels in such a manner as to be prevented from becoming such a braking force allocation as to destabilize the vehicle behavior, on the basis of the difference between the braking force generated in the left wheels and the braking force in the right wheels with respect to the vehicle moving direction.

The thrust force control portions of the motor-driven brake units B1 to B4 control the motor-driven brake actuators in the respective wheels on the basis of the thrust force command value so as to generate the braking force.

Further, the malfunction detecting portions of the motor-driven brake units B1 to B4 refer to the thrust force command value, and the actual thrust force from the thrust force sensor provided within the motor-driven brake actuator, and determines the malfunction of the motor-driven brake units B1 to B4 in accordance with this comparison. Specifically, in the case that the difference between the thrust force command value and the actual thrust force is equal to or more than a predetermined value, or in the case that the difference equal to or more than the predetermined value between the thrust force command value and the actual thrust force lasts for a predetermined time or more, or the like, it determines that the motor-driven brake unit breaks down. In accordance with this structure, it is possible to independently detect at least the malfunction of the motor-driven brake actuators B1 to B4. Further, the malfunction detecting portion can be structured such that the voltage for directly detecting the various malfunctions and the information from the current detecting portion are input thereto. For example, the malfunction detecting portion may refer to the value from the voltage detecting portion for detecting the malfunction of the motor-driven brake actuator 22 caused by the disconnection or the contact failure of the signal line 27 or 28, the disconnection or the contact failure of the power supply line 26a or 26b, the voltage reduction or the malfunction of the power supply 24 or the like, thereby detecting the malfunction.

Further, as the control structure, the hydraulic motor-driven brake unit may be employed in place of the motor-driven brake unit, in the slave system of the brake control apparatus.

FIG. 16 shows a control block structure in the case of using the hydraulic motor-driven brake unit.

The structure is the same as the case of using the motor-driven brake unit, until the requested braking force Fcmd is allocated to the target braking force generated in each of the wheels on the basis of the malfunction position applied from the malfunction determining portion by the braking force allocation control portion, and is different only in a point that the target braking force in each of the wheels is generated by the hydraulic motor-driven brake unit. The present invention relates to a method of calculating the target braking force in each of the wheels, and a description will be given of an embodiment in accordance with the present invention on the basis of a case of using the motor-driven brake unit. However, the same matter is applied even in the case that the slave system is constituted by the hydraulic motor-driven brake.

Further, in the motor-driven brake unit or the hydraulic motor-driven brake unit, since approximately a faithful braking force can be generated with respect to the target braking force in each of the wheels, a description will be given on the assumption that the target braking force equals to the braking force.

Figure 17:
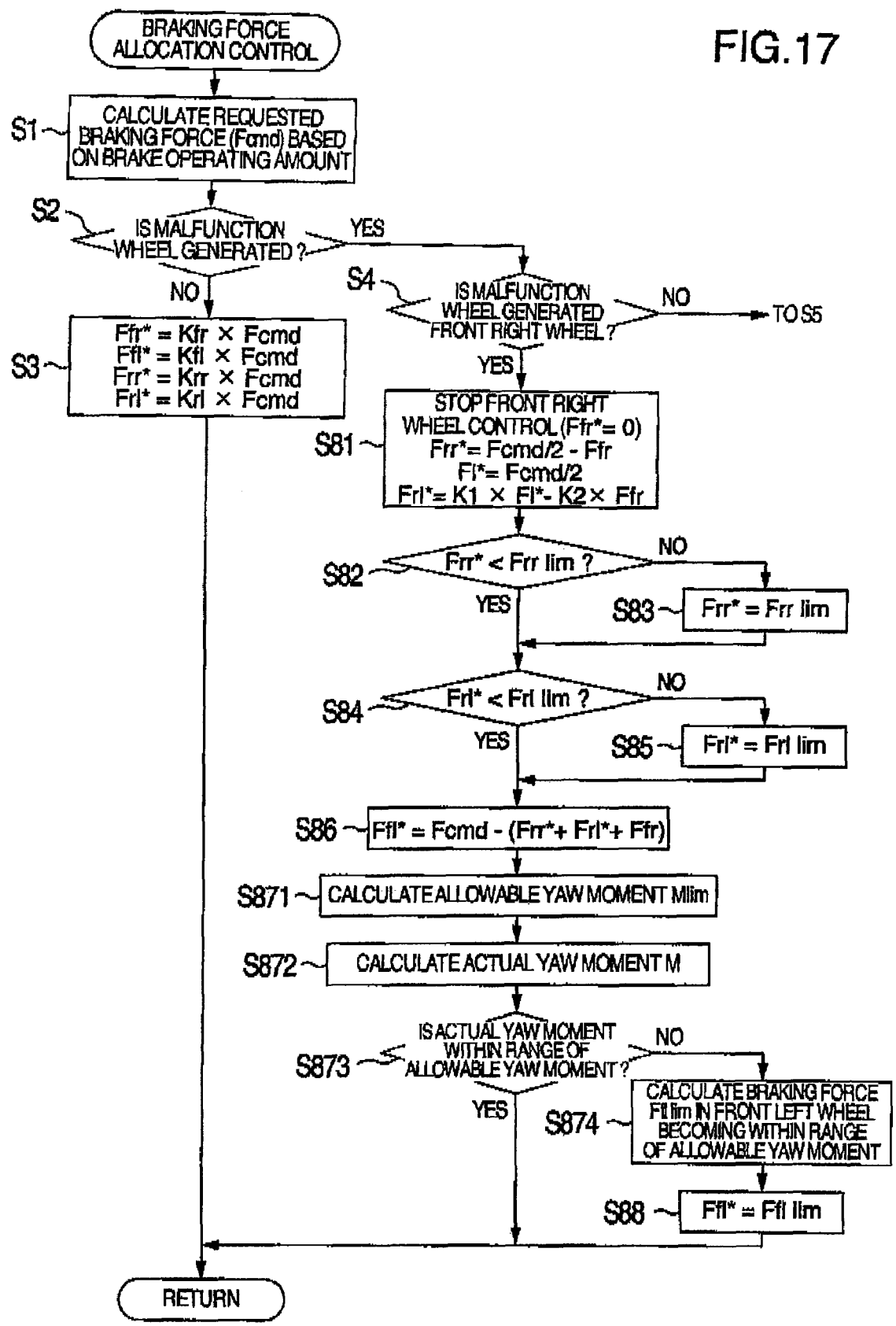
FIG. 17 is a flow chart of the brake control apparatus in FIGS. 15 and 16.
Figure 19:
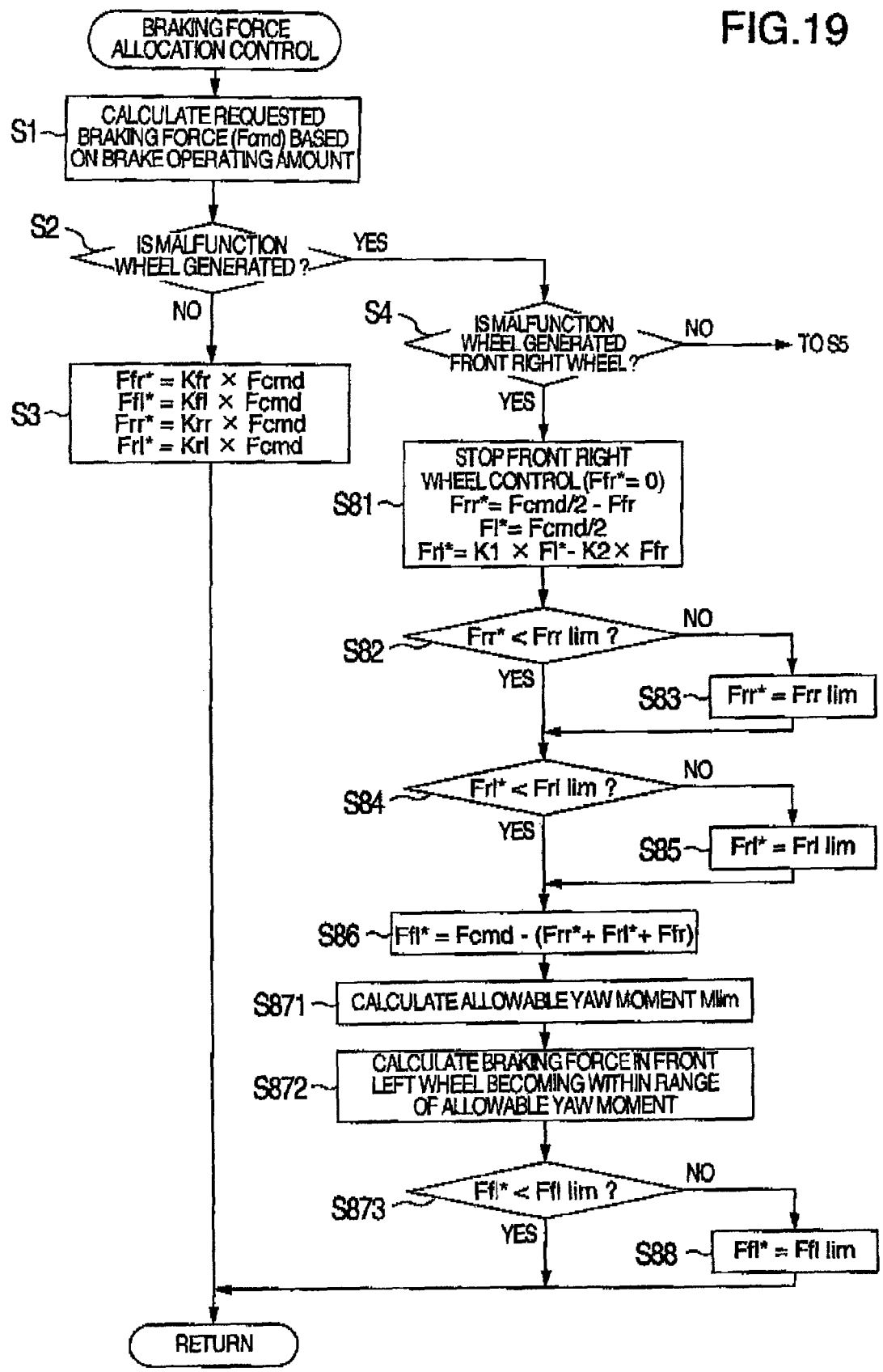
FIG. 19 is a flow chart of the brake control apparatus in FIGS. 15 and 16.

FIGS. 17 and 19 show a flow chart of the brake control apparatus in FIGS. 15 and 16.

In this embodiment, a description will be given of one example of the control mode for the front right wheel malfunction time in the step S8, with regard to the control modes for the respective wheels malfunction in the steps S8 to S11 and the steps S22 and S33 in FIG. 6, however, it is possible to apply to the control modes for the front left wheel, rear right wheel, rear left wheel, front right and rear left wheels and front left and rear right wheels malfunction time in the steps S9 to S11 and the steps S22 and S33 in FIG. 6 on the basis of the same logic.

The steps S1 to S86 in FIG. 17 of the present embodiment are the same as the steps S1 to S86 in FIG. 8, and correspond to a control mode obtained by adding a logic for controlling the braking force within the range of the allowable yaw moment to the output in the step S86, for safely generating the braking force so as not to disarrange the vehicle behavior.

In this case, the actual yaw moment corresponds to a yaw moment around a vehicle gravity point which is generated by the failure of at least one wheel and is generated on the basis of the difference between the braking force generated in the right wheels with respect to the vehicle and the braking force generated in the left wheel, and the allowable yaw moment corresponds to an allowable value of the actual yaw moment which is determined on the basis of at least one of the vehicle speed and the steered angle and does not disarrange the vehicle behavior.

The steps 871 first calculates an allowable yaw moment Mlim. In this case, a calculating method of the allowable yaw moment may employ a previously set value (a map corresponding to the vehicle speed and the steered angle) based on at least one of the vehicle speed and the steered angle, or may calculate a deviation Δγ between a normative yaw rate γt and an actual yaw rate γ and employ a value (a map expressing a relation between Δγ and the allowable yaw moment) based on the previously set Δγ. In this case, the normative yaw rate γt is calculated by the following expression 11 in which reference symbol A denotes a stability factor, reference symbol V denotes a vehicle speed, reference symbol 1 denotes a wheel base of the vehicle, reference δ denotes a steered angle, reference symbol T denotes a time constant, and reference symbol s denotes a Laplace operator.

$$\gamma_t = \frac{1}{1+Ts} \frac{1}{1+AV^2} \frac{V}{l} \delta \qquad (11)$$

The actual yaw rate γ is detected by the yaw rate sensor. Further, a deviation Δγ between the normative yaw rate γt and the actual yaw rate γ is calculated on the basis of the following expression 12.

$$\Delta\gamma = \gamma_t - \gamma \qquad (12)$$

Next, the step S872 calculates the actual yaw moment M. In this case, the actual yaw moment M is calculated from the braking force and the tread in each of the wheels, as shown in the following expression 13.

$$M = df(Ffr - Ffl^*) + dr(Frr^* - Frl^*) \qquad (13)$$

The expression 13 corresponds to an example in which each of the wheels W1 to W4 is arranged line symmetrically with respect to the moving direction of the vehicle gravity center, the yaw moment in a clockwise direction is set positive, and the yaw moment in a counterclockwise direction is set to negative, and reference symbols df and dr respectively denote one half of the tread in the front side, and one half of the tread in the rear side.

Further, reference symbol Ffr denotes an actual braking force generated in the front right wheel W1, and reference symbols Ffl*, Frr* and Frl* denote target braking forces generated in the respective normal wheels determined in the steps S81 to S86. In this case, the actual braking force Ffr generated in the front right wheel W1 corresponding to the wheel under malfunction may be calculated on the basis of an estimated value of the road surface μ and a wheel load, by detecting a force pressing the braking member to the braked member 23 generated by the brake apparatus in the front right wheel W1, by means of a force sensor, or may be calculated on the basis of the estimated value of the road surface μ and the wheel load, by converting the force pressing the braking member to the braked member 23 generated by the brake apparatus in the front right wheel W1, from the pedaling force applied to the brake pedal, in the case of the mechanical backup system.

Further, the actual yaw moment M may be determined on the basis of the yaw rate sensor, or may be determined in accordance with the following expression 14.

$$M = df(Ffr - Ffl) + dr(Frr - Frl) \qquad (14)$$

Reference symbols Ffl, Frr and Frl in the expression 14 denote actual braking forces of the front left wheel W2, the rear right wheel W3 and the rear left wheel W4 corresponding to the normal wheels. Further, the actual braking force generated in each of the normal wheels is obtained detecting the force pressing the braking member to the braked member 23 generated by the brake apparatus in each of the wheels, by means of the force sensor, or estimating from a motor current and calculating on the basis of the estimated value of the road surface μ and the wheel load.

The step S873 determines whether or not the actual yaw moment M determined in the step S872 is within the range of the allowable yaw moment Mlim determined in the step S871, and in the case that the actual yaw moment is within the range of the allowable yaw moment, the target braking forces in the respective normal wheels come to Ffl*, Frr* and Frl* calculated in the steps S81 to S86.

In the case that the actual yaw moment is out of the range of the allowable yaw moment, the step S874 calculates the limit value Ffl lim of the target braking force generated by the motor-driven brake unit B2 in the front left wheel which becomes within the allowable yaw moment.

In this case, the value Ffl lim is calculated in accordance with the following expression 15.

$$Ffl\ lim=Ffr+(dr(Frr^*-Frl^*)\times Mlim)/df \quad (15)$$

The calculation is executed by substituting the allowable yaw moment for Mlim, the actual braking force for Ffr, and the target braking forces generated by the rear right wheel and the rear left wheel respectively for Frr* and Frl*. Further, in the case that the expression 14 is used at a time of calculating the actual moment M, the value Ffl lim is calculated in accordance with the following expression 16.

$$Ffl\ lim=Ffr+(dr(Frr-Frl)\times Mlim)/df \quad (16)$$

In this case, reference symbol Frr and Frl respectively denote the actual braking forces of the rear right wheel W3 and the rear left wheel W4.

Further, the step S88 sets Ffl=Ffl lim in such a manner as to become within the allowable yaw moment, and sets limits to the target braking force Ffl* generated by the motor-driven brake unit B2 in the front left wheel.

Figure 18:
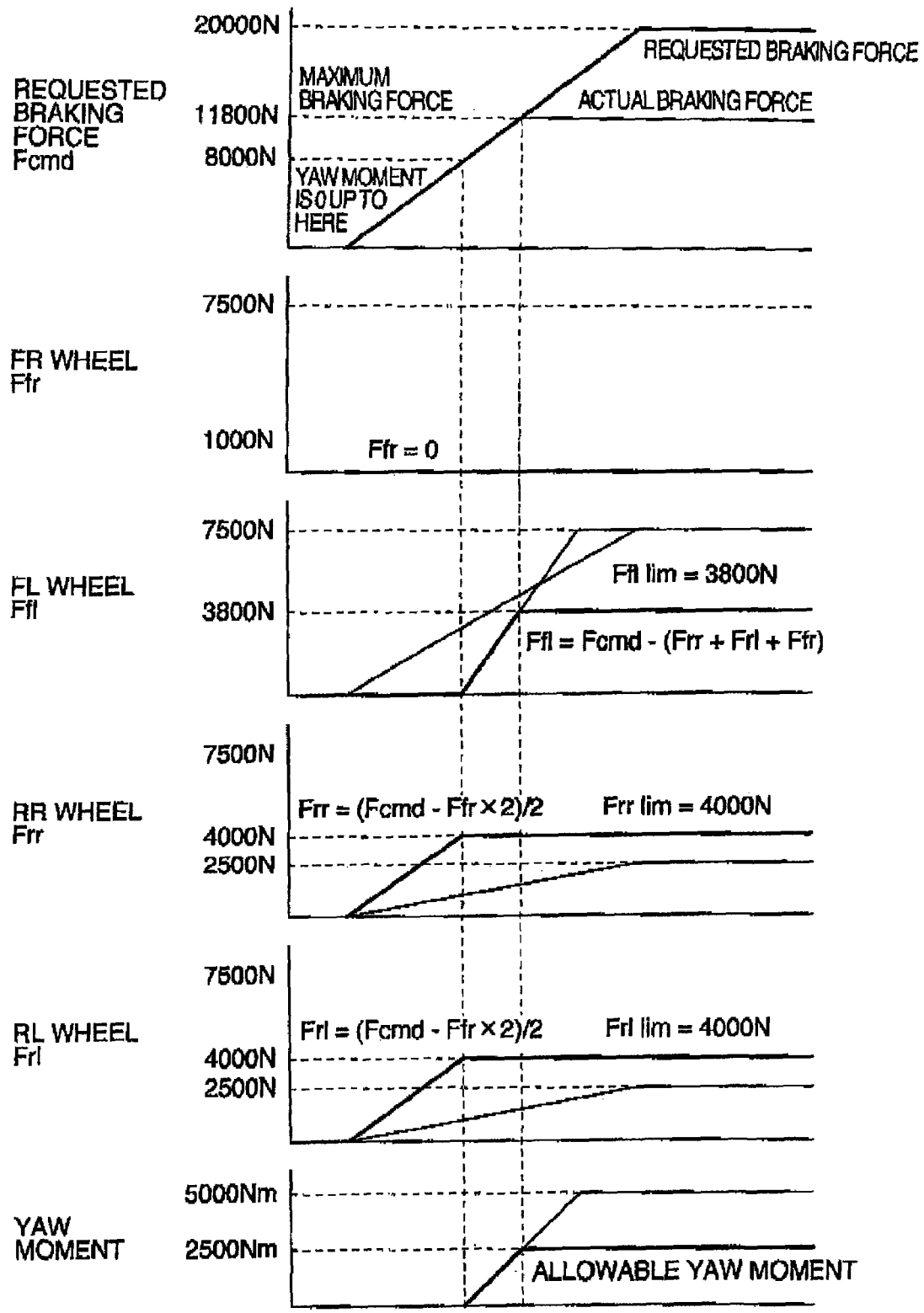
FIG. 18 is a view showing an example of results in FIG. 17.

FIG. 18 shows a result obtained by controlling the braking force by the motor-driven brake units B1, B2, B3 and B4 in the respective wheels in the case of passing through the steps S81 to S88 under the same condition as FIG. 10, in the flow chart in FIG. 17. A limit is applied by the value Ffl lim in such a manner that the target braking force Ffl* generated by the motor-driven brake unit B2 in the front left wheel becomes within the range of the allowable yaw moment, in accordance with the steps S871 to S88, with respect to FIG. 10. Since the braking force is generated in each of the wheels so as to always become within the range of the allowable yaw moment as mentioned above, it is possible to provide the brake control apparatus which can secure the braking force as much as possible and can inhibit the vehicle behavior from becoming unstable due to the difference between the right and left braking force caused by the malfunction, even if the malfunction is generated in the brake apparatus.

Further, the present invention can be achieved by using a flow chart of a brake control apparatus shown in FIG. 19.

A description will be given of one example of the control mode for the front right wheel malfunction time, with regard to the control mode for each of the wheel malfunction times from the step S8 to the step S11 in FIG. 6, in a flow chart of a brake control apparatus shown in FIG. 19, however, it is possible to apply the control modes for the front left wheel, rear right wheel and rear left wheel malfunction time from the step S9 to the step S11 in FIG. 6, on the basis of the same logic.

In the flow chart of the brake control apparatus shown in FIG. 19, the steps S1 to S871 are the same as FIG. 17, however, the logic for controlling the braking force within the range of the allowable yaw moment after the step S871 is different from the embodiment mentioned above.

The step calculates in the same manner as the embodiment 3 until the step 871, and the step 872 calculates the limit value Ffl lim of the target braking force generated by the motor-driven brake unit B2 in the front left wheel in such a manner as to become within the range of the allowable yaw moment in the same manner as the step S874 in FIG. 17.

Further, the step S873 determines whether or not the target braking force Ffl* generated by the motor-driven brake unit B2 in the front left wheel calculated by the step S86 is smaller than the value Ffl lim calculated by the step S874, and in the case that it is smaller, the target braking forces in the respective normal wheels come to Ffl*, Frr* and Frl* calculated by the steps s81 to S86.

In the case that Ffl* is equal to or more than Ffl Jim, the step S88 sets the relation Ffl*=Ffl lim, and applies a limit to the target braking force Ffl* generated by the motor-driven brake unit B2 in the front left wheel.

In the case of passing through the step S88 from the step S81 under the same condition as FIG. 10, in the flow chart in FIG. 19, a result obtained by controlling the braking forces by the motor-driven brake units B1, B2, B3 and B4 in the respective wheels is the same as the FIG. 18 and a limit is applied by Ffl lim in such a manner that the target braking force Ffl* generated by the motor-driven brake unit B2 in the front left wheel becomes within the range of the allowable yaw moment, in accordance with the steps S871 to S88, with respect to FIG. 10.

Further, in the present embodiment, the value Ffl lim is calculated by first calculating the allowable yaw moment and thereafter using the allowable yaw moment in accordance with the steps S871 and S872 in FIG. 19, however, the value Ffl lim may be directly calculated by setting the value of Ffl lim (a map corresponding to the vehicle speed and the steered angle) based on at least one of the vehicle speed and the steered angle from the beginning while omitting the calculation of the allowable yaw moment, or the value Ffl lim may be directly calculated from a value (a map expressing a relation between Δγ and Ffl lim) of Ffl lim based on the deviation Δγ between the normative yaw rate γt and the actual yaw rate γ.

The example of calculating on the basis of the braking force is shown above, however, the structure may be made such as to previously convert the requested braking force Fcmd into the requested pressing force, and calculate on the basis of the pressing force.

Figure 20:
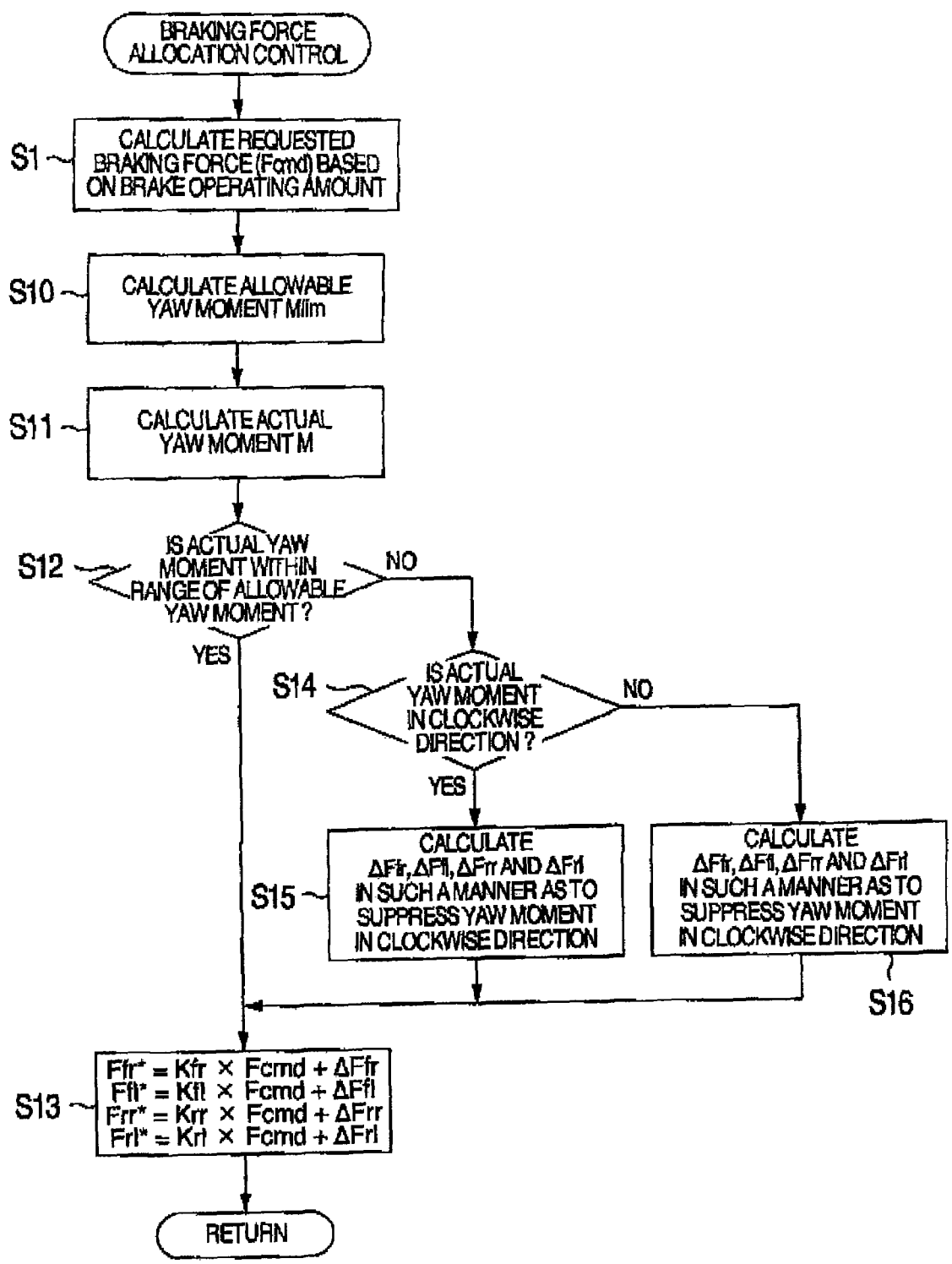
FIG. 20 is a flow chart of a brake control apparatus in accordance with the other embodiment of the present invention.
Figure 21:
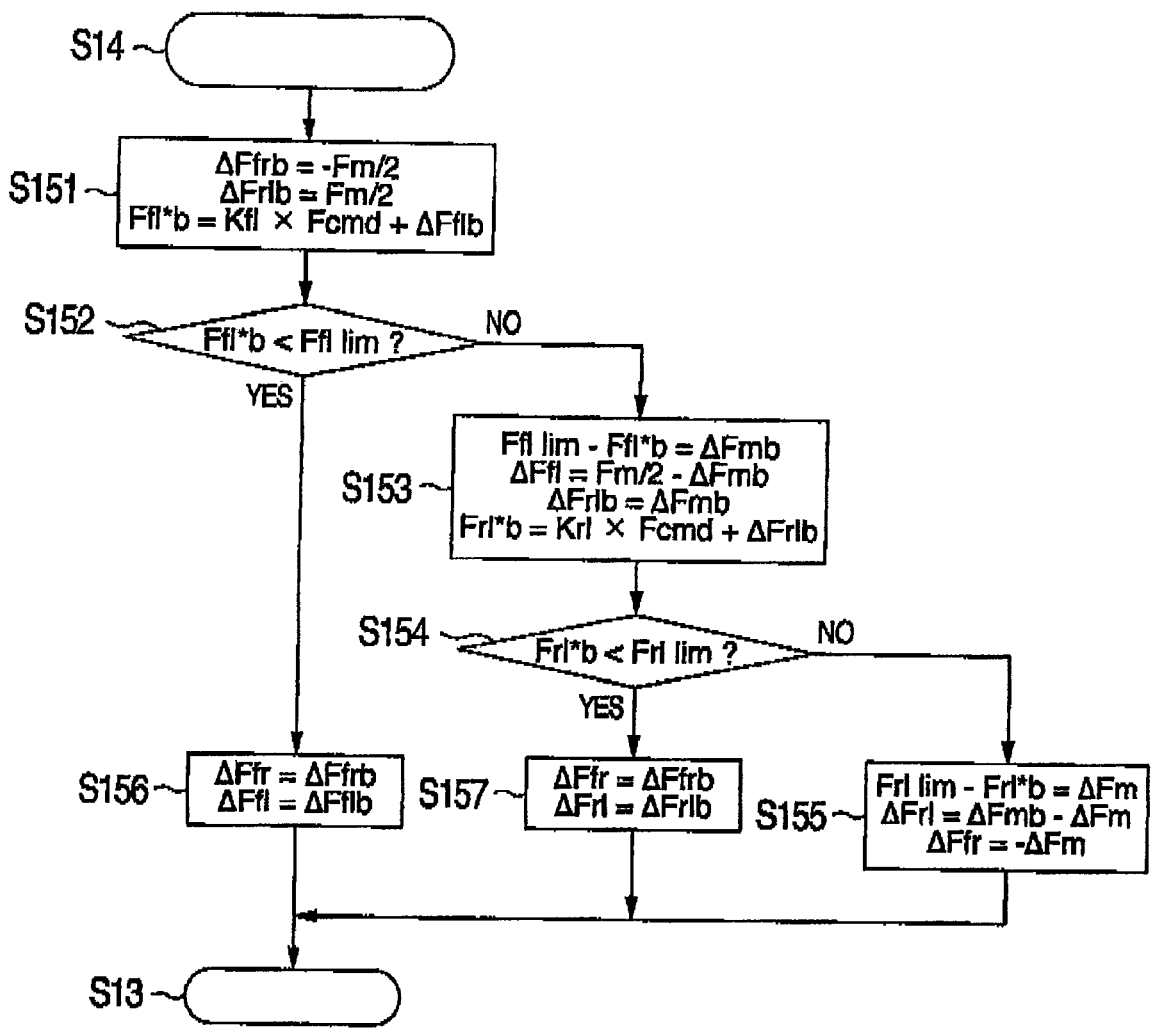
FIG. 21 is a flow chart of a brake control apparatus in accordance with the other embodiment of the present invention.

FIGS. 20 and 21 show a flow chart of a brake control apparatus in accordance with the other embodiment of the present invention, in which FIG. 21 is a flow chart showing an example of a processing content of the step S15 described in FIG. 20. Further, a direction of the yaw moment is set such that a clockwise direction is positive, and a counterclockwise direction is set to negative, in this example.

A description will be first given of the flow chart in FIG. 20. In the step S, the requested braking force Fcmd of the driver is calculated on the basis of the brake operating mount detecting apparatus 3. In the step S10, the allowable yaw moment is determined in the same manner as the step S871 in FIG. 17 in accordance with the embodiment 2. In the step S11, the actual yaw moment is calculated. In this case, the actual yaw moment may be determined on the basis of the yaw rate sensor, or may be calculated from the braking force and the tread in each of the wheels in the same manner as the expression 8 in accordance with the embodiment 2.

The step S12 determines whether or not the braking force can be controlled within the range of the allowable yaw moment. In this case, in the case that the actual yaw moment is within the allowable yaw moment, the step S13 calculates the target braking forces Ffr*, Ffl*, Frr* and Frl generated in the respective wheels. In this case, ΔFfr, ΔFfl, ΔFrr and ΔFrl respectively correspond to compensation values of the target braking forces generated by the motor-driven brake units B1, B2, B3 and B4 in the front right wheel the front left wheel, the rear right wheel and the rear left wheel, and an initial value is ΔFfr=ΔFfl=ΔFrr =ΔFrl=0.

In the case that the actual yaw moment is not within the range of the allowable yaw moment, the step determines that a balance between the total of the braking forces generated in the wheels W1 and W3 in the right side of the vehicle and the total of the braking forces generated in the wheels W2 and W4 in the left side is improper, and calculates the compensation values ΔFfr, ΔFfl, ΔFrr and ΔFrl of the braking forces generated in the respective wheels on and after the step S14, in such a manner as to become within the allowable yaw moment.

The step S14 determines whether the actual yaw moment is clockwise or counterclockwise.

In the case that it is clockwise, the step determines that the total of the braking forces generated in the wheels W1 and W3 in the right side of the vehicle is larger than the total of the braking forces generated in the wheels W2 and W4 in the left side, and the step S15 calculates the compensation values ΔFfr, ΔFfl, ΔFrr and ΔFrl of the braking forces generated in the respective wheels such as to decrease the braking forces generated in the wheels W1 and W3 in the right side of the vehicle and increase the braking forces generated in the wheels W2 and W4 in the left side, for achieving such a right and left braking force allocation as to be within the range of the allowable yaw moment.

In the case that it is counterclockwise, the step determines that the total of the braking forces generated in the wheels W2 and W4 in the left side is larger than the total of the braking forces generated in the wheels W1 and W3 in the right side of the vehicle, and the step S16 calculates the compensation values ΔFfr, ΔFfl, ΔFrr and ΔFrl of the braking forces generated in the respective wheels such as to decrease the braking forces generated in the wheels W2 and W4 in the left side of the vehicle and increase the braking forces generated in the wheels W1 and W3 in the right side, for achieving such the right and left braking force allocation as to be within the range of the allowable yaw moment.

Further, the step S13 calculates the target braking forces Ffr*, Ffl*, Frr* and Frl* generated in the respective wheels to which the compensation values ΔFfr, ΔFfl, ΔFrr and ΔFrl of the braking forces generated in the respective wheels calculated in the step S15 or S16 are added.

Next, a description will be given of one example of the processing content of the step S15 described in FIG. 20 by using FIG. 21.

First, reference symbols described in FIG. 21 are defined. Reference symbols ΔFfrb, ΔFflb and ΔFrlb respectively denote values temporarily determining compensation values of the target braking forces generated in the motor-driven brake units B1, B2 and B4 in the front right wheel, the front left wheel and the rear left wheel. An initial value of the values is ΔFfrb=ΔFflb=ΔFrlb=0. Reference symbol Fm denotes a braking force difference between the total of the braking forces in the left side with respect to the vehicle and the total of the braking forces in the right side, caused by the amount that the actual yaw moment gets over the allowable yaw moment, for example, in the case that the front and rear treads are equal, the braking force difference Fm can be expressed by the following expression 17 on the assumption that one half of the tread is set to d, and the yaw moment at the degree that the actual moment M protrudes from the limit of the allowable yaw moment Mlim is set to ΔM, $$FM = \Delta M/d \quad (17)$$

Reference symbols Ffr*b, Ffl*b and Frl*b respectively denote temporarily determined values of the braking force command values generated by the motor-driven brake units B1, B2 and B4 in the front right wheel, the front left wheel and the rear left wheel, and in the same manner as FIG. 4, references Kfl and Krl respectively denote the allocation ratios of the braking forces generated by the motor-driven brake units B2 and B4, and reference symbol Fcmd denotes the requested braking force.

Since the steps S12 and S14 determines that the actual yaw moment gets over the allowable yaw moment in the clockwise direction, it is considered that the total of the braking forces generated in the wheels W1 and W3 in the right side of the vehicle is larger than the total of the braking forces generated in the wheels W2 and W4 in the left side. Accordingly, there is shown a method of calculating the compensation values ΔFfr, ΔFfl, ΔFrr and ΔFrl of the braking forces generated in the respective wheels, in such a manner that the steps S151 to S157 decreases the braking force generated in the wheels in the right side of the vehicle and increases the braking forces generated in the wheels in the left sides for achieving the right and left braking force allocation so as to be within the range of the allowable yaw moment, and for preventing each of the wheels from reaching the limit of the braking force.

First, the step S151 divides the lateral braking force difference Fm required to be compensated into two equal parts for setting within the range of the allowable moment determined by the expression 6, reduces the value Fm/2 or more from the braking force in the right side, and temporarily determining the compensation value for increasing the braking force in the left side at the value Fm/2 or more. Accordingly, in the present flow chart, the compensation value of the braking force generated by the motor-driven brake unit B1 in the front right wheel is temporarily determined as ΔFrb=−Fm/2, and the compensation value of the braking force generated by the motor-driven brake unit B2 in the front left wheel is temporarily determined as ΔFflb=Fm/2 Further, the target braking force Ffl* generated by the motor-driven brake unit B2 in the front left wheel in which the force is increased is temporarily calculated as Ffl*b.

Next, the step S152 determines whether or not the temporarily calculated target braking force Ffl*b in the front left wheel is within the range of the braking force limit Ffl lim. If it is within the range, the braking force control is established within the range of the allowable yaw moment by the compensation values ΔFfrb and ΔFflb temporarily determined in the step S151. Accordingly, the step S156 substitutes the temporarily determined compensation values ΔFfrb and ΔFflb respectively for ΔFfr and ΔFfl, and decides the compensation values so as to calculate the target braking forces in the respective wheels in the step S13.

In the case that the temporarily calculated target braking force Ffl*b in the front left wheel gets over the braking force limit Ffl lim in the front left wheel, the steps S153 on and after recalculate the compensation value in such a manner as to be capable of controlling the braking force within the range of the allowable yaw moment.

The step S153 first calculates how much the temporarily calculated target braking force Ffl*b in the front left wheel gets over the braking force limit Ffl lim. The braking force calculated here is set to ΔFmb in the step S153. In this case, if the braking force compensation value ΔFflb in the front left wheel temporarily determined in the step S151 is equal to or less than Fm/2–ΔFmb, the target braking force Ffl*b in the front left wheel becomes within the range of the braking force limit. Accordingly, the braking force compensation value ΔFfl in the front left wheel is decided as Fm/2–ΔFmb. Then, since the braking force in the left side runs short at the amount ΔFmb, the braking force compensation value in the left wheel is temporarily determined as ΔFrlb=ΔFmb for compensating the amount ΔFmb by the rear left wheel. Further, the target braking force Frl*b in the rear left wheel is temporarily calculated.

Next, the step S154 determines whether or not the temporarily calculated target braking force Frl*b in the rear left wheel is within the range of the braking force limit Frl lim in the rear left wheel. If it is within the range, the braking force control within the allowable yaw moment is established by the compensation value ΔFrlb temporarily determined by the step S153. Accordingly, the step S157 decides the compensation value temporarily determined by the step S153 as the compensation value and the step S13 calculates the target braking force in each of the wheels.

In the case that the temporarily calculated target braking force Frl*b in the rear left wheel gets over the braking force limit Frl lim, the braking forces in the left wheels reach the limit in both wheels. Therefore, the braking force is controlled within the range of the allowable yaw moment by lowering the braking forces of the wheels in the right side.

Then, the step S155 first calculates how much the temporarily calculated target braking force Frl*b in the rear left wheel gets over the braking force limit Frl lim in the same manner as the step S153. The braking force calculated here is set to ΔFm in the step S155. In this case, on the basis of the value ΔFm, if the braking force compensation value ΔFrlb in the rear left wheel temporarily determined by the step S153 is equal to or less than ΔFmb–ΔFm, the target braking force Frl*b in the rear left wheel temporarily calculated by the step S153 becomes within the range of the braking force limit. Accordingly, the braking force compensation value ΔFrl in the rear left wheel is decided as ΔFmb–ΔFm. Then, the braking force in the left side runs short at the amount ΔFm. However, since it is impossible to compensate the amount ΔFm any more by the left wheels, the braking force in the right side is decreased at the amount ΔFm. Accordingly, in the present embodiment, the value–ΔFm is substituted for the braking force compensation value ΔFfr in the front right wheel, however, may be substituted for the braking force compensation value ΔFrr in the rear right wheel. As mentioned above, the braking force compensation value in each of the wheels is decided, and the target braking force in each of the wheels is calculated in the step S13.

There is shown above one example of the processing contents of the step S15 in the flow chart in FIG. 20 by using FIG. 21, however, the process in the step S16 can be achieved by a logic obtained by counterchanging the logic of decreasing the braking force generated in the left wheels and increasing the braking force generated in the right wheels between the right and left wheels in FIG. 21, for setting the yaw moment in the counterclockwise direction to the range of the allowable yaw moment.

Further, the temporary determination of the compensation value is executed from the front wheel in both the right and left wheels in the step S151 in FIG. 21, however, may be executed from the rear wheel.

FIG. 7 shows a flow chart of a brake control apparatus in accordance with the other embodiment of the present invention.

As one example of a specific method of calculating the target braking force generated in each of the wheels in accordance with the control mode of the steps S8 to S11, S22 and 523 in FIG. 6 in correspondence to the wheel under malfunction, a description will be given of a case that the brake apparatus in the right front wheel is out of order with reference to the flow chart in FIG. 7. Since the steps S1 to S4 in FIG. 7 are the same as the steps S1 to S4 in FIG. 21, a description thereof will be omitted.

First, the step S81 stops the control of the motor-driven brake unit B1 in the front right wheel, and sets the target braking force Ffr* generated by the motor-driven brake unit B1 in the front right wheel to 0. Next, the target braking force Frr* generated by the motor-driven brake unit B3 in the rear right wheel is calculated by the following expression 18.

$$Frr^* = Fcmd/2 - Ffr \tag{18}$$

In this case, reference symbol Ffr denotes an actual braking force generated in the front right wheel. In the case of a system (hereinafter, refer to as a mechanical backup) structured such that the braking force can be generated by the pedaling force at a time of stopping the control of the motor-driven brake unit, the braking force is generated in the failure wheel. Accordingly, it is possible to allocate so as to make the total of the braking forces generated in the right wheels W1 and W3 equal to the total of the braking forces generated in the left wheels W2 and W4 by allocating the target braking forces in such a manner as to set the total of the braking forces generated in the front right wheel W1 and the rear right wheel W3 to one half of the requested braking force Fcmd and generate the remaining one half of the requested braking force Fcmd by the front left wheel W2 and the rear left wheel W4, by subtracting the braking force Ffr caused by the mechanical backup of the wheel W1 at a time of calculating the target braking force Frr* generated by the motor-driven brake unit B3 in the rear right wheel in accordance with the expression 18. Of course, since the condition Ffr*=0 is set at the outset of the present step even in the motor-driven brake unit having no mechanical backup, the relation Ffr=0 is established, and there is achieved the target braking force allocation generated by dividing the requested braking force Fcmd into two equal parts by the motor-driven brake unit B3 in the rear right wheel, and the motor-driven brake units B2 and B4 in the left wheels. Further, the reference symbol Ffr is set to the actual braking force generated in the front right wheel in the expression 18, however, the estimated braking force calculated from the pedaling force at a time of the mechanical backup may be employed.

The step S81 calculates the target braking force Frr* generated by the motor-driven brake unit B3 in the rear right wheel, however, there is a limit in the braking force which can be generated by the motor-driven brake unit B3 in the rear right wheel and the braking force which can be generated by the motor-driven brake unit B4 in the rear left wheel, the step S82 first determines whether or not the target braking force Frr* generated by the motor-driven brake unit B3 in the rear right wheel is within the range of the braking force limit Frr lim. In the case that it is out of the range, the step S83 limits the target braking force Frr* generated by the motor-driven brake unit B3 to the braking force limit Frr lim.

In this case, the braking force limit Frr lim of the motor-driven brake unit B3 may be set to a fixed value on the basis of the vehicle data, or may be set to be variable in correspondence to the vehicle traveling state and the road surface state. In this case, it is calculated on the basis of the relation among the estimated value of the road surface μ, the load of each of the wheels and the estimated lateral force. Further, it may be determined on the basis of the hydraulic pressure at a time when the right rear wheel W3 comes to the look tendency, or may be determined by updating to the present braking force or less on the basis of the braking force at a time when the ABS is actuated. In the case that the braking force is within the range in the step S82, or the braking force of the motor-driven brake unit B3 is limited to the braking force limit Frr lim by the step S83, the step goes to the step S84.

The step S84 calculates the total Fl* of the target braking forces generated by the motor-driven brake unit B2 in the front left wheel and the motor-driven brake unit B4 in the rear left wheel in accordance with the following expression 19.

$$Fl^* = Frr^* + Ffr \quad (19)$$

By calculating the value Fl* such as the expression 19, there can be obtained such a target braking force allocation that the total of the braking forces generated in the wheels in the right side of the vehicle becomes equal to the total of the braking forces generated in the wheels in the left side of the vehicle even if the value Frr* is limited to Frr lim by the step S83.

Thereafter, the step allocates a target braking force allocation Fl* generated by the motor-driven brake units B2 and B4 in the left wheels to the target braking force Ffl* generated by the motor-driven brake unit B2 in the front left wheel and the target braking force Frl* generated by the motor-driven brake unit B4 in the rear left wheel. However, in the present embodiment, a description will be first given of a case of calculating from the target braking force Frl* generated in the motor-driven brake unit B4 in the rear left wheel. The target braking force Frl* generated by the motor-driven brake unit B4 in the rear left wheel is calculated in accordance with the following expression.

$$Frl^* = K1 \times Fcmd/2 - K2 \times Ffr \quad (20)$$

In this case, Ffr employs the same value as the expression 5 of the step S81. Reference symbols K1 and K2 denote a proportion coefficient equal to or more than 0 and equal to or less than 1. In the case that K1=0 and K2=2, a rate of the target braking force generated by the wheel W4 in the target braking force generated by the left wheels W2 and W4 comes to 100%. Further, in the case that K1=0 and K2=0, the rate of the target braking force generated by the wheel W4 in the target braking force generated by the left wheels W2 and W4 comes to 50%. Further, in the case that K1=1 and K2=1, Frl* of the expression 20 and Frr* of the expression 18 come to the same expression, and the target braking force generated by the rear left wheel and the rear right wheel becomes equal to the requested braking force. In this case, in the relation between K1 and K2, it is necessary to prevent a relation K1×Fcmd/2<K2×Ffr.

In the same manner as the rear right wheel, since there is a limit in the braking force capable of being generated by the motor-driven brake unit B4 in the rear left wheel with regard to the target braking force Frl* generated by the motor-driven brake unit B4 in the rear left wheel calculated by the step S81, the steps S85 and S86 limit the target braking force Frl* generated by the motor-driven brake unit B4 in the rear left wheel in such a manner as to become equal to or less than the braking force limit Frl lim of the motor-driven brake unit B4, in the same manner as the steps S82 and S83.

Next, the step S87 calculates the target braking force Ffl* generated by the motor-driven brake unit B2 in the front left wheel in accordance with the following expression.

$$Ffl^* = Fl^* - Frl^* \quad (21)$$

The shortfall of the braking force generated in the left wheels of the vehicle is generated by calculating the target braking force Ffl* generated by the motor-driven brake unit B2 in the front left wheel as in the expression 21.

As mentioned above, it is possible to achieve such a target braking force allocation that the total of the braking force generated in the wheels W1 and W3 in the right side of the vehicle becomes equal to the total of the braking force generated in the wheels W2 and W4 in the left side of the vehicle, by calculating the target braking force generated in each of the wheels in accordance with the steps S81 to S87.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A brake control system comprising:

brake apparatuses respectively provided in front and rear wheels on one side of left and right sides of a vehicle for generating braking forces in the wheels;

brake apparatuses respectively provided in front and rear wheels on another side of the left and right sides of the vehicle for generating braking forces in the wheels; and a brake control apparatus configured to calculate a target braking force of each of said brake apparatuses on the basis of a brake operating amount, to determine whether or not each of said brake apparatuses breaks down and a whole target braking force with respect to said one side and said another side brake apparatuses on the basis of said brake operating amount, wherein:

(1) in an event that each of said brake apparatuses operates normally, said brake control apparatus determines said one side and another side target braking forces on the basis of the whole target braking force of said brake apparatuses, so that a sum of said one side front and rear brake apparatuses is identical to a sum of said another side front and rear brake apparatuses, and said brake control apparatus determines the target braking force of each of said one side and said another side brake apparatuses so that a ratio between the target braking forces of the front brake apparatus and the rear brake apparatus reaches a predetermined distribution ratio with respect to each of said one side and said another side, thereby setting as the target braking force of each of the brake apparatuses, (2) in an event that said brake control apparatus determines that one of the one side brake apparatuses in said brake apparatuses breaks down, said brake control apparatus sets the target braking force of said brake apparatus which is determined to break down so that the braking force of said brake apparatus which is determined to break down reaches zero or a backup braking force, and said brake control apparatus determines the target braking force of the normal brake apparatus, (3) said brake control apparatus determines whether or not the determined target braking force of the normal brake apparatus exceeds a braking force limit value of said brake apparatus, and sets said determined target braking force as the target braking force of said normal brake apparatus, when it has been determined that the target braking force of the normal brake apparatus does not exceed said braking force limit value, and (4) said brake control apparatus sets said braking force limit value as the target braking force of said normal brake apparatus when it has been determined that said determined target braking force exceeds said braking force limit value.

2. A brake control system as claimed in claim 1, wherein said brake control apparatus is configured to determine a yaw moment from the determined target braking forces of said one side front and rear brake apparatuses and said another side front and rear brake apparatuses, then whether or not said determined yaw moment is within an allowable yaw moment, and then the target braking force of said another side brake apparatus in which said yaw moment comes within said allowable yaw moment when said determined yaw moment exceeds said allowable yaw moment, thereby setting a target braking force within the allowable yaw moment as said increased target braking force.

* * * * *